United States Patent
Akkarakaran et al.

(10) Patent No.: US 12,324,042 B2
(45) Date of Patent: Jun. 3, 2025

(54) UTILIZING SIDELINK PROCEDURES TO REACT TO TIMING SOURCE OUTAGES

(71) Applicant: QUALCOMM Incorporated, San Diego, CA (US)

(72) Inventors: Sony Akkarakaran, Poway, CA (US); Jingchao Bao, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 757 days.

(21) Appl. No.: 17/402,486

(22) Filed: Aug. 13, 2021

(65) Prior Publication Data

US 2023/0045849 A1    Feb. 16, 2023

(51) Int. Cl.
*H04W 76/18* (2018.01)
*H04W 36/30* (2009.01)
*H04W 76/14* (2018.01)

(52) U.S. Cl.
CPC ......... *H04W 76/18* (2018.02); *H04W 36/305* (2018.08); *H04W 76/14* (2018.02)

(58) Field of Classification Search
CPC ........... H04W 36/305; H04W 56/0015; H04W 56/002; H04W 56/0025; H04W 56/003; H04W 76/14; H04W 76/18
See application file for complete search history.

(56) References Cited

U.S. PATENT DOCUMENTS

| | | | | |
|---|---|---|---|---|
| 10,075,217 | B1* | 9/2018 | Sung | H04B 7/15507 |
| 2019/0200313 | A1* | 6/2019 | Cai | H04W 56/0025 |
| 2021/0360725 | A1* | 11/2021 | Tang | H04W 24/04 |
| 2023/0246701 | A1* | 8/2023 | Cheng | H04W 68/005 |
| | | | | 370/315 |

(Continued)

FOREIGN PATENT DOCUMENTS

WO   2020167773 A1   8/2020

OTHER PUBLICATIONS

ETSI MCC: "Report of 3GPP TSG RAN WG2 Meeting #113bis-e, Online", 3GPP TSG-RAN WG2 meeting #114-e, Draft_R2-113bis-E_Meeting_Report_V3, 3rd Generation Partnership Project (3GPP), Mobile Competence Centre, 650, Route Des Lucioles, F-06921 Sophia-Antipolis Cedex, France, No. Online, Apr. 12, 2021-Apr. 20, 2021, May 10, 2021, 279 Pages, XP052003691, pp. 136-148.

(Continued)

*Primary Examiner* — Awet Haile
(74) *Attorney, Agent, or Firm* — SUNSTEIN LLP/Qualcomm

(57) ABSTRACT

Techniques are provided for utilizing sidelink communications in response to a timing source outage. An example method for utilizing sidelink communications in response to a timing source outage according to the disclosure includes detecting the timing source outage associated with a first node, determining a second node experiencing a loss of services due to least in part on the timing source outage in the first node, determining a third node with a valid timing (Continued)

source, determining one or more relay nodes based at least in part on a location of the second node and a location of the third node, and providing one or more services to the second node via the one or more relay nodes.

15 Claims, 14 Drawing Sheets

(56) References Cited

U.S. PATENT DOCUMENTS

2024/0031975 A1* 1/2024 Baek .................. H04W 4/40

OTHER PUBLICATIONS

International Search Report and Written Opinion—PCT/US2022/032118—ISA/EPO—Sep. 9, 2022.
Kalbkhani H., et al., "Relay Selection for Multi-Source Network-Coded D2D Multicast Communications in Heterogeneous Networks", Wireless Networks, ACM, 2 Penn Plaza, Suite 701 - New York USA, vol. 26, No. 8, Jul. 15, 2020 (Jul. 15, 2020), 18 Pages, XP037259749 [retrieved on Jul. 15, 2020] p. 6066-p. 6070.

* cited by examiner

UTILIZING SIDELINK PROCEDURES TO REACT TO TIMING SOURCE OUTAGES

BACKGROUND

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service, a fourth-generation (4G) service (e.g., Long Term Evolution (LTE) or WiMax), and a fifth generation (5G) service (e.g., 5G New Radio (NR)). There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Frequency Division Multiple Access (FDMA), Time Division Multiple Access (TDMA), the Global System for Mobile access (GSM) variation of TDMA, etc.

A wireless communication system may include a number of cells that may operate synchronously or asynchronously. For synchronous operation, the timing of each cell may closely track the timing of neighbor cells. Synchronous operation may be achieved by having each cell align its timing to a reference time source, which may be a global navigation satellite system (GNSS). For asynchronous operation, the timing of each cell may not track and may even be pseudo-random with respect to the timing of neighbor cells. Some features of a wireless communication, such as carrier aggregation (CA) and certain positioning operations depend on synchronization. Local or global GNSS outages may impact the ability of cells to synchronize. A cell may desire to operate synchronously but may temporarily be unable to align its timing to the reference time source due to the GNSS outage. It may be desirable to effectively handle such temporary loss of synchronization due to a GNSS outage in order to mitigate performance degradation.

SUMMARY

An example method for utilizing sidelink communications in response to a timing source outage according to the disclosure includes detecting the timing source outage associated with a first node, determining a second node experiencing a loss of services due to least in part on the timing source outage in the first node, determining a third node with a valid timing source, determining one or more relay nodes based at least in part on a location of the second node and a location of the third node, and providing one or more services to the second node via the one or more relay nodes.

Implementations of such a method may include one or more of the following features. The timing source outage may be based on a failure to decode a global navigation satellite system satellite signal. Determining the second node may include determining a coverage area for the first node and determining that the second node is within the coverage area. Determining the third node may include receiving an indication of the valid timing source from the third node. The one or more services may include a time value based on the valid timing source. The one or more services may include one or more positioning reference signal resources. The one or more services may include a mobility set. Sidelink configuration information may be provided to the one or more relay nodes. The sidelink configuration information may be provided via one or more system information blocks transmitted to the one or more relay nodes via radio resource control signaling.

An example method for selecting an alternate timing source according to the disclosure includes receive an indication of a timing source outage in a first node, determine the alternate timing source based on a prioritized list of timing sources, and obtain timing information from the alternate timing source.

Implementations of such a method may include one or more of the following features. The indication of the timing source outage may be a failure to decode a global navigation satellite system satellite signal. The indication of a timing of the timing source outage may be one or more timing source outage notification messages. Determining the alternate timing source may be based at least in part on one or more information elements in the one or more timing source outage notification messages. The prioritized list of timing sources may be received from a network server. The prioritized list of timing sources may be included in one or more system information blocks. The prioritized list of timing sources may be included in one or more long term evolution positioning protocol messages. The alternate timing source may be a radio access network time obtained from a second node. the alternate timing source may be a global navigation satellite system time. The alternate timing source may be a user equipment, and the timing information is obtained via a sidelink connection with the user equipment.

An example apparatus according to the disclosure includes a memory, at least one transceiver, at least one processor communicatively coupled to the memory and the at least one transceiver, and configured to detect a timing source outage associated with a first node, determine a second node experiencing a loss of services due to least in part on the timing source outage in the first node, determine a third node with a valid timing source, determine one or more relay nodes based at least in part on a location of the second node and a location of the third node, and provide one or more services to the second node via the one or more relay nodes.

An example apparatus according to the disclosure includes a memory, at least one transceiver, at least one processor communicatively coupled to the memory and the at least one transceiver and configured to receive an indication of a timing source outage in a first node, determine an alternate timing source based on a prioritized list of timing sources, and obtain timing information from the alternate timing source.

Items and/or techniques described herein may provide one or more of the following capabilities, as well as other capabilities not mentioned. Satellite navigation systems may be used to synchronize the timing of network nodes, however, satellite signals are susceptible to jamming and other effects which may impact reception of the signals and the timing synchronization of the nodes. A node may experience a timing source outage when satellite signals are not received and/or decoded. A node may detect the loss of a timing source and notify the network. The node may also provide a timing drift value. Network nodes may relay the timing source outage information to other network nodes. Sidelink communication links may be used to obtain an alternate timing source. A sidelink chain may be used to determine an area of a timing source outage, and/or to provide services to nodes affected by the timing source outage. Lists of alternate timing sources may be provided to nodes. Timing source outage notification messages may be used to trigger a node to select an alternate timing source.

Other capabilities may be provided and not every implementation according to the disclosure must provide any, let alone all, of the capabilities discussed.

DETAILED DESCRIPTION

Techniques are discussed herein for utilizing sidelink communications in response to a timing source outage. In general, different communication networks and various features within the communication networks may require synchronization among the network nodes. For example, LTE may utilize synchronous and asynchronous nodes. 5G-NR networks may utilize system frame number (SFN) synchronization in Time Division Duplex (TDD) deployments. Some terrestrial navigation techniques such as Time of Arrival (ToA) and Time Difference of Arrival (TDoA) require that a positioning computation node (e.g., network entity) be aware of synchronization offsets between the nodes transmitting positioning reference signals. Thus, each node must be capable of receiving signals from a timing source to maintain the timing synchronization. Some nodes may utilize the timing signals associated with Global Navigation Satellite Systems (GNSS) to maintain a synchronized time.

GNSS systems are subject to outages for many reasons. For example, local outages may occur due to the presence of a local jammer or a failure/degradation in the receive chain of a GNSS receiver. Global outages, such as with large scale jamming, solar activity, or satellite malfunctions may also cause a station to lose GNSS timing information.

The techniques provided herein enable a network node to derive a time value and receive other services based on sidelink communications with other network nodes. For example, a network node such as a base station may be configured to detect a timing outage based on GNSS signal decode failures. Other network nodes, such as mobile devices, may be configured to detect a timing outage based on reference signals transmitted from other nodes that are suffering the timing source outage. Timing source outage messages may be carried as part of a protocol between two or more nodes. The timing source outage messages may be relayed to multiple nodes via sidelink. The timing source outage messages may include details about the timing outage event. User equipment (UE) may prioritize how to derive a timing reference. A UE may be configured to prioritize GNSS timing over serving cell timing. A base station may derive timing information from in-coverage UE. Device-to-device (D2D) sidelink synchronization procedures may be used to reestablish timing information. Network services provided to a UE may be provided via sidelink chain. These techniques and configurations are examples, and other techniques and configurations may be used.

Figure 1:
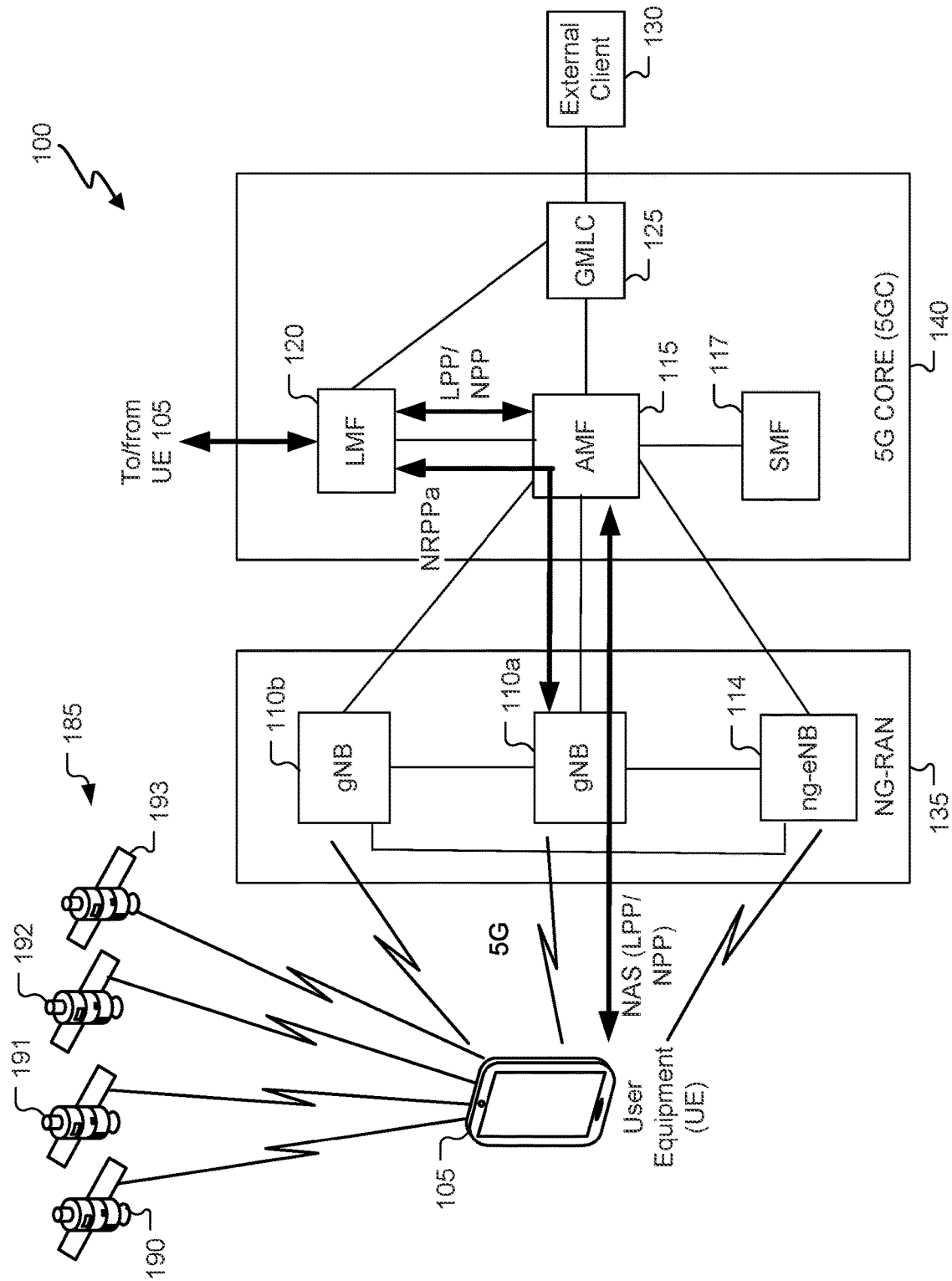
FIG. 1 is a simplified diagram of an example wireless communications system.

Referring to FIG. 1, an example of a communication system 100 includes a UE 105, a Radio Access Network (RAN) 135, here a Fifth Generation (5G) Next Generation (NG) RAN (NG-RAN), and a 5G Core Network (5GC) 140. The UE 105 may be, e.g., an IoT device, a location tracker device, a cellular telephone, or other device. A 5G network may also be referred to as a New Radio (NR) network; NG-RAN 135 may be referred to as a 5G RAN or as an NR RAN; and 5GC 140 may be referred to as an NG Core network (NGC). Standardization of an NG-RAN and 5GC is ongoing in the 3$^{rd}$ Generation Partnership Project (3GPP). Accordingly, the NG-RAN 135 and the 5GC 140 may conform to current or future standards for 5G support from 3GPP. The NG-RAN 135 may be another type of RAN, e.g., a 3G RAN, a 4G Long Term Evolution (LTE) RAN, etc. The communication system 100 may utilize information from a constellation 185 of satellite vehicles (SVs) 190, 191, 192, 193 for a Satellite Positioning System (SPS) (e.g., a Global Navigation Satellite System (GNSS)) like the Global Positioning System (GPS), the Global Navigation Satellite System (GLONASS), Galileo, or Beidou or some other local or regional SPS such as the Indian Regional Navigational Satellite System (IRNSS), the European Geostationary Navigation Overlay Service (EGNOS), or the Wide Area Augmentation System (WAAS). Additional components of the communication system 100 are described below. The communication system 100 may include additional or alternative components. In an embodiment, the SVs 190, 191, 192, 193 may provide synchronized timing information to the nodes in the communication system 100. For example, the time references in a GNSS system may include GPS time (GPST), GLONASS time (GLONASST), Galileo System Time (GST), BeiDou Time (BDT), or other synchronized timing signals. In an embodiment, the nodes in the communication system 100 may utilize the GNSS timing information as a timing source to maintain synchronization between the nodes. Local or global outages in the GNSS signal may cause timing source outages for some nodes in the network and impact synchronous sensitive procedures (e.g., inter-cell interference coordination, handover, mobility, time-of-flight based positioning, etc.).

As shown in FIG. 1, the NG-RAN 135 includes NR nodeBs (gNBs) 110a, 110b, and a next generation eNodeB (ng-eNB) 114, and the 5GC 140 includes an Access and Mobility Management Function (AMF) 115, a Session Management Function (SMF) 117, a Location Management Function (LMF) 120, and a Gateway Mobile Location Center (GMLC) 125. The gNBs 110a, 110b and the ng-eNB 114 are communicatively coupled to each other, are each configured to bi-directionally wirelessly communicate with the UE 105, and are each communicatively coupled to, and configured to bi-directionally communicate with, the AMF 115. The AMF 115, the SMF 117, the LMF 120, and the GMLC 125 are communicatively coupled to each other, and the GMLC is communicatively coupled to an external client 130. The SMF 117 may serve as an initial contact point of a Service Control Function (SCF) (not shown) to create, control, and delete media sessions.

FIG. 1 provides a generalized illustration of various components, any or all of which may be utilized as appropriate, and each of which may be duplicated or omitted as necessary. Specifically, although one UE 105 is illustrated, many UEs (e.g., hundreds, thousands, millions, etc.) may be utilized in the communication system 100. Similarly, the communication system 100 may include a larger (or smaller) number of SVs (i.e., more or fewer than the four SVs 190-193 shown), gNBs 110*a*, 110*b*, ng-eNBs 114, AMFs 115, external clients 130, and/or other components. The illustrated connections that connect the various components in the communication system 100 include data and signaling connections which may include additional (intermediary) components, direct or indirect physical and/or wireless connections, and/or additional networks. Furthermore, components may be rearranged, combined, separated, substituted, and/or omitted, depending on desired functionality.

While FIG. 1 illustrates a 5G-based network, similar network implementations and configurations may be used for other communication technologies, such as 3G, Long Term Evolution (LTE), etc. Implementations described herein (be they for 5G technology and/or for one or more other communication technologies and/or protocols) may be used to transmit (or broadcast) directional synchronization signals, receive and measure directional signals at UEs (e.g., the UE 105) and/or provide location assistance to the UE 105 (via the GMLC 125 or other location server) and/or compute a location for the UE 105 at a location-capable device such as the UE 105, the gNB 110*a*, 110*b*, or the LMF 120 based on measurement quantities received at the UE 105 for such directionally-transmitted signals. The gateway mobile location center (GMLC) 125, the location management function (LMF) 120, the access and mobility management function (AMF) 115, the SMF 117, the ng-eNB (eNodeB) 114 and the gNBs (gNodeBs) 110*a*, 110*b* are examples and may, in various embodiments, be replaced by or include various other location server functionality and/or base station functionality respectively.

The UE 105 may comprise and/or may be referred to as a device, a mobile device, a wireless device, a mobile terminal, a terminal, a mobile station (MS), a Secure User Plane Location (SUPL) Enabled Terminal (SET), or by some other name. Moreover, the UE 105 may correspond to a cellphone, smartphone, laptop, tablet, PDA, tracking device, navigation device, Internet of Things (IoT) device, asset tracker, health monitors, security systems, smart city sensors, smart meters, wearable trackers, or some other portable or moveable device. Typically, though not necessarily, the UE 105 may support wireless communication using one or more Radio Access Technologies (RATs) such as Global System for Mobile communication (GSM), Code Division Multiple Access (CDMA), Wideband CDMA (WCDMA), LTE, High Rate Packet Data (HRPD), IEEE 802.11 WiFi (also referred to as Wi-Fi), Bluetooth® (BT), Worldwide Interoperability for Microwave Access (WiMAX), 5G new radio (NR) (e.g., using the NG-RAN 135 and the 5GC 140), etc. The UE 105 may support wireless communication using a Wireless Local Area Network (WLAN) which may connect to other networks (e.g., the Internet) using a Digital Subscriber Line (DSL) or packet cable, for example. The use of one or more of these RATs may allow the UE 105 to communicate with the external client 130 (e.g., via elements of the 5GC 140 not shown in FIG. 1, or possibly via the GMLC 125) and/or allow the external client 130 to receive location information regarding the UE 105 (e.g., via the GMLC 125).

The UE 105 may include a single entity or may include multiple entities such as in a personal area network where a user may employ audio, video and/or data I/O (input/output) devices and/or body sensors and a separate wireline or wireless modem. An estimate of a location of the UE 105 may be referred to as a location, location estimate, location fix, fix, position, position estimate, or position fix, and may be geographic, thus providing location coordinates for the UE 105 (e.g., latitude and longitude) which may or may not include an altitude component (e.g., height above sea level, height above or depth below ground level, floor level, or basement level). Alternatively, a location of the UE 105 may be expressed as a civic location (e.g., as a postal address or the designation of some point or small area in a building such as a particular room or floor). A location of the UE 105 may be expressed as an area or volume (defined either geographically or in civic form) within which the UE 105 is expected to be located with some probability or confidence level (e.g., 67%, 95%, etc.). A location of the UE 105 may be expressed as a relative location comprising, for example, a distance and direction from a known location. The relative location may be expressed as relative coordinates (e.g., X, Y (and Z) coordinates) defined relative to some origin at a known location which may be defined, e.g., geographically, in civic terms, or by reference to a point, area, or volume, e.g., indicated on a map, floor plan, or building plan. In the description contained herein, the use of the term location may comprise any of these variants unless indicated otherwise. When computing the location of a UE, it is common to solve for local x, y, and possibly z coordinates and then, if desired, convert the local coordinates into absolute coordinates (e.g., for latitude, longitude, and altitude above or below mean sea level).

The UE 105 may be configured to communicate with other entities using one or more of a variety of technologies. The UE 105 may be configured to connect indirectly to one or more communication networks via one or more device-to-device (D2D) peer-to-peer (P2P) links. The D2D P2P links may be supported with any appropriate D2D radio access technology (RAT), such as LTE Direct (LTE-D), WiFi Direct (WiFi-D), Bluetooth®, and so on. One or more of a group of UEs utilizing D2D communications may be within a geographic coverage area of a Transmission/Reception Point (TRP) such as one or more of the gNBs 110*a*, 110*b*, and/or the ng-eNB 114. Other UEs in such a group may be outside such geographic coverage areas, or may be otherwise unable to receive transmissions from a base station. Groups of UEs communicating via D2D communications may utilize a one-to-many (1:M) system in which each UE may transmit to other UEs in the group. A TRP may facilitate scheduling of resources for D2D communications. In other cases, D2D communications may be carried out between UEs without the involvement of a TRP.

Base stations (BSs) in the NG-RAN 135 shown in FIG. 1 include NR Node Bs, referred to as the gNBs 110*a* and 110*b*. Pairs of the gNBs 110*a*, 110*b* in the NG-RAN 135 may be connected to one another via one or more other gNBs. Access to the 5G network is provided to the UE 105 via wireless communication between the UE 105 and one or more of the gNBs 110*a*, 110*b*, which may provide wireless communications access to the 5GC 140 on behalf of the UE 105 using 5G. In FIG. 1, the serving gNB for the UE 105 is assumed to be the gNB 110*a*, although another gNB (e.g. the gNB 110*b*) may act as a serving gNB if the UE 105 moves to another location or may act as a secondary gNB to provide additional throughput and bandwidth to the UE 105.

Base stations (BSs) in the NG-RAN 135 shown in FIG. 1 may include the ng-eNB 114, also referred to as a next generation evolved Node B. The ng-eNB 114 may be connected to one or more of the gNBs 110*a*, 110*b* in the NG-RAN 135, possibly via one or more other gNBs and/or one or more other ng-eNBs. The ng-eNB 114 may provide LTE wireless access and/or evolved LTE (eLTE) wireless access to the UE 105. One or more of the gNBs 110*a*, 110*b* and/or the ng-eNB 114 may be configured to function as positioning-only beacons which may transmit signals to assist with determining the position of the UE 105 but may not receive signals from the UE 105 or from other UEs.

The Base Stations, such as the gNB 110*a*, gNB 110*b*, ng-eNB 114, may each comprise one or more TRPs. For example, each sector within a cell of a BS may comprise a TRP, although multiple TRPs may share one or more components (e.g., share a processor but have separate antennas). The communication system 100 may include macro TRPs or the communication system 100 may have TRPs of different types, e.g., macro, pico, and/or femto TRPs, etc. A macro TRP may cover a relatively large geographic area (e.g., several kilometers in radius) and may allow unrestricted access by terminals with service subscription. A pico TRP may cover a relatively small geographic area (e.g., a pico cell) and may allow unrestricted access by terminals with service subscription. A femto or home TRP may cover a relatively small geographic area (e.g., a femto cell) and may allow restricted access by terminals having association with the femto cell (e.g., terminals for users in a home).

As noted, while FIG. 1 depicts nodes configured to communicate according to 5G communication protocols, nodes configured to communicate according to other communication protocols, such as, for example, an LTE protocol or IEEE 802.11x protocol, may be used. For example, in an Evolved Packet System (EPS) providing LTE wireless access to the UE 105, a RAN may comprise an Evolved Universal Mobile Telecommunications System (UMTS) Terrestrial Radio Access Network (E-UTRAN) which may comprise base stations comprising evolved Node Bs (eNBs). A core network for EPS may comprise an Evolved Packet Core (EPC). An EPS may comprise an E-UTRAN plus EPC, where the E-UTRAN corresponds to the NG-RAN 135 and the EPC corresponds to the 5GC 140 in FIG. 1.

The gNBs 110*a*, 110*b* and the ng-eNB 114 may communicate with the AMF 115, which, for positioning functionality, communicates with the LMF 120. The AMF 115 may support mobility of the UE 105, including cell change and handover and may participate in supporting a signaling connection to the UE 105 and possibly data and voice bearers for the UE 105. The LMF 120 may communicate directly with the UE 105, e.g., through wireless communications. The LMF 120 may support positioning of the UE 105 when the UE 105 accesses the NG-RAN 135 and may support position procedures/methods such as Assisted GNSS (A-GNSS), Observed Time Difference of Arrival (OTDOA), Real Time Kinematics (RTK), Precise Point Positioning (PPP), Differential GNSS (DGNSS), Enhanced Cell ID (E-CID), angle of arrival (AOA), angle of departure (AOD), and/or other position methods. The LMF 120 may process location services requests for the UE 105, e.g., received from the AMF 115 or from the GMLC 125. The LMF 120 may be connected to the AMF 115 and/or to the GMLC 125. The LMF 120 may be referred to by other names such as a Location Manager (LM), Location Function (LF), commercial LMF (CLMF), or value added LMF (VLMF). A node/system that implements the LMF 120 may additionally or alternatively implement other types of location-support modules, such as an Enhanced Serving Mobile Location Center (E-SMLC) or a Secure User Plane Location (SUPL) Location Platform (SLP). At least part of the positioning functionality (including derivation of the location of the UE 105) may be performed at the UE 105 (e.g., using signal measurements obtained by the UE 105 for signals transmitted by wireless nodes such as the gNBs 110*a*, 110*b* and/or the ng-eNB 114, and/or assistance data provided to the UE 105, e.g. by the LMF 120).

The GMLC 125 may support a location request for the UE 105 received from the external client 130 and may forward such a location request to the AMF 115 for forwarding by the AMF 115 to the LMF 120 or may forward the location request directly to the LMF 120. A location response from the LMF 120 (e.g., containing a location estimate for the UE 105) may be returned to the GMLC 125 either directly or via the AMF 115 and the GMLC 125 may then return the location response (e.g., containing the location estimate) to the external client 130. The GMLC 125 is shown connected to both the AMF 115 and LMF 120, though one of these connections may be supported by the 5GC 140 in some implementations.

As further illustrated in FIG. 1, the LMF 120 may communicate with the gNBs 110*a*, 110*b* and/or the ng-eNB 114 using a New Radio Position Protocol A (which may be referred to as NPPa or NRPPa), which may be defined in 3GPP Technical Specification (TS) 38.455. NRPPa may be the same as, similar to, or an extension of the LTE Positioning Protocol A (LPPa) defined in 3GPP TS 36.455, with NRPPa messages being transferred between the gNB 110*a* (or the gNB 110*b*) and the LMF 120, and/or between the ng-eNB 114 and the LMF 120, via the AMF 115. As further illustrated in FIG. 1, the LMF 120 and the UE 105 may communicate using an LTE Positioning Protocol (LPP), which may be defined in 3GPP TS 36.355. The LMF 120 and the UE 105 may also or instead communicate using a New Radio Positioning Protocol (which may be referred to as NPP or NRPP), which may be the same as, similar to, or an extension of LPP. Here, LPP and/or NPP messages may be transferred between the UE 105 and the LMF 120 via the AMF 115 and the serving gNB 110*a*, 110*b* or the serving ng-eNB 114 for the UE 105. For example, LPP and/or NPP messages may be transferred between the LMF 120 and the AMF 115 using a 5G Location Services Application Protocol (LCS AP) and may be transferred between the AMF 115 and the UE 105 using a 5G Non-Access Stratum (NAS) protocol. The LPP and/or NPP protocol may be used to support positioning of the UE 105 using UE-assisted and/or UE-based position methods such as A-GNSS, RTK, OTDOA and/or E-CID. The NRPPa protocol may be used to support positioning of the UE 105 using network-based position methods such as E-CID (e.g., when used with measurements obtained by the gNB 110*a*, 110*b* or the ng-eNB 114) and/or may be used by the LMF 120 to obtain location related information from the gNBs 110*a*, 110*b* and/or the ng-eNB 114, such as parameters defining directional SS transmissions from the gNBs 110*a*, 110*b*, and/or the ng-eNB 114.

With a UE-assisted position method, the UE 105 may obtain location measurements and send the measurements to a location server (e.g., the LMF 120) for computation of a location estimate for the UE 105. For example, the location measurements may include one or more of a Received Signal Strength Indication (RSSI), Round Trip signal propagation Time (RTT), Reference Signal Time Difference (RSTD), Reference Signal Received Power (RSRP) and/or Reference Signal Received Quality (RSRQ) for the gNBs 110a, 110b, the ng-eNB 114, and/or a WLAN AP. The location measurements may also or instead include measurements of GNSS pseudorange, code phase, and/or carrier phase for the SVs 190-193.

With a UE-based position method, the UE 105 may obtain location measurements (e.g., which may be the same as or similar to location measurements for a UE-assisted position method) and may compute a location of the UE 105 (e.g., with the help of assistance data received from a location server such as the LMF 120 or broadcast by the gNBs 110a, 110b, the ng-eNB 114, or other base stations or APs).

With a network-based position method, one or more base stations (e.g., the gNBs 110a, 110b, and/or the ng-eNB 114) or APs may obtain location measurements (e.g., measurements of RSSI, RTT, RSRP, RSRQ or Time Of Arrival (TOA) for signals transmitted by the UE 105) and/or may receive measurements obtained by the UE 105. The one or more base stations or APs may send the measurements to a location server (e.g., the LMF 120) for computation of a location estimate for the UE 105.

Information provided by the gNBs 110a, 110b, and/or the ng-eNB 114 to the LMF 120 using NRPPa may include timing and configuration information for directional SS transmissions and location coordinates. The LMF 120 may provide some or all of this information to the UE 105 as assistance data in an LPP and/or NPP message via the NG-RAN 135 and the 5GC 140.

An LPP or NPP message sent from the LMF 120 to the UE 105 may instruct the UE 105 to do any of a variety of things depending on desired functionality. For example, the LPP or NPP message could contain an instruction for the UE 105 to obtain measurements for GNSS (or A-GNSS), WLAN, E-CID, and/or OTDOA (or some other position method). In the case of E-CID, the LPP or NPP message may instruct the UE 105 to obtain one or more measurement quantities (e.g., beam ID, beam width, mean angle, RSRP, RSRQ measurements) of directional signals transmitted within particular cells supported by one or more of the gNBs 110a, 110b, and/or the ng-eNB 114 (or supported by some other type of base station such as an eNB or WiFi AP). The UE 105 may send the measurement quantities back to the LMF 120 in an LPP or NPP message (e.g., inside a 5G NAS message) via the serving gNB 110a (or the serving ng-eNB 114) and the AMF 115.

As noted, while the communication system 100 is described in relation to 5G technology, the communication system 100 may be implemented to support other communication technologies, such as GSM, WCDMA, LTE, etc., that are used for supporting and interacting with mobile devices such as the UE 105 (e.g., to implement voice, data, positioning, and other functionalities). In some such embodiments, the 5GC 140 may be configured to control different air interfaces. For example, the 5GC 140 may be connected to a WLAN using a Non-3GPP InterWorking Function (N3IWF, not shown FIG. 1) in the 5GC 150. For example, the WLAN may support IEEE 802.11 WiFi access for the UE 105 and may comprise one or more WiFi APs. Here, the N3IWF may connect to the WLAN and to other elements in the 5GC 140 such as the AMF 115. In some embodiments, both the NG-RAN 135 and the 5GC 140 may be replaced by one or more other RANs and one or more other core networks. For example, in an EPS, the NG-RAN 135 may be replaced by an E-UTRAN containing eNBs and the 5GC 140 may be replaced by an EPC containing a Mobility Management Entity (MME) in place of the AMF 115, an E-SMLC in place of the LMF 120, and a GMLC that may be similar to the GMLC 125. In such an EPS, the E-SMLC may use LPPa in place of NRPPa to send and receive location information to and from the eNBs in the E-UTRAN and may use LPP to support positioning of the UE 105. In these other embodiments, positioning of the UE 105 using directional PRSs may be supported in an analogous manner to that described herein for a 5G network with the difference that functions and procedures described herein for the gNBs 110a, 110b, the ng-eNB 114, the AMF 115, and the LMF 120 may, in some cases, apply instead to other network elements such eNBs, WiFi APs, an MME, and an E-SMLC.

As noted, in some embodiments, positioning functionality may be implemented, at least in part, using the directional SS beams, sent by base stations (such as the gNBs 110a, 110b, and/or the ng-eNB 114) that are within range of the UE whose position is to be determined (e.g., the UE 105 of FIG. 1). The UE may, in some instances, use the directional SS beams from a plurality of base stations (such as the gNBs 110a, 110b, the ng-eNB 114, etc.) to compute the UE's position.

Figure 2:
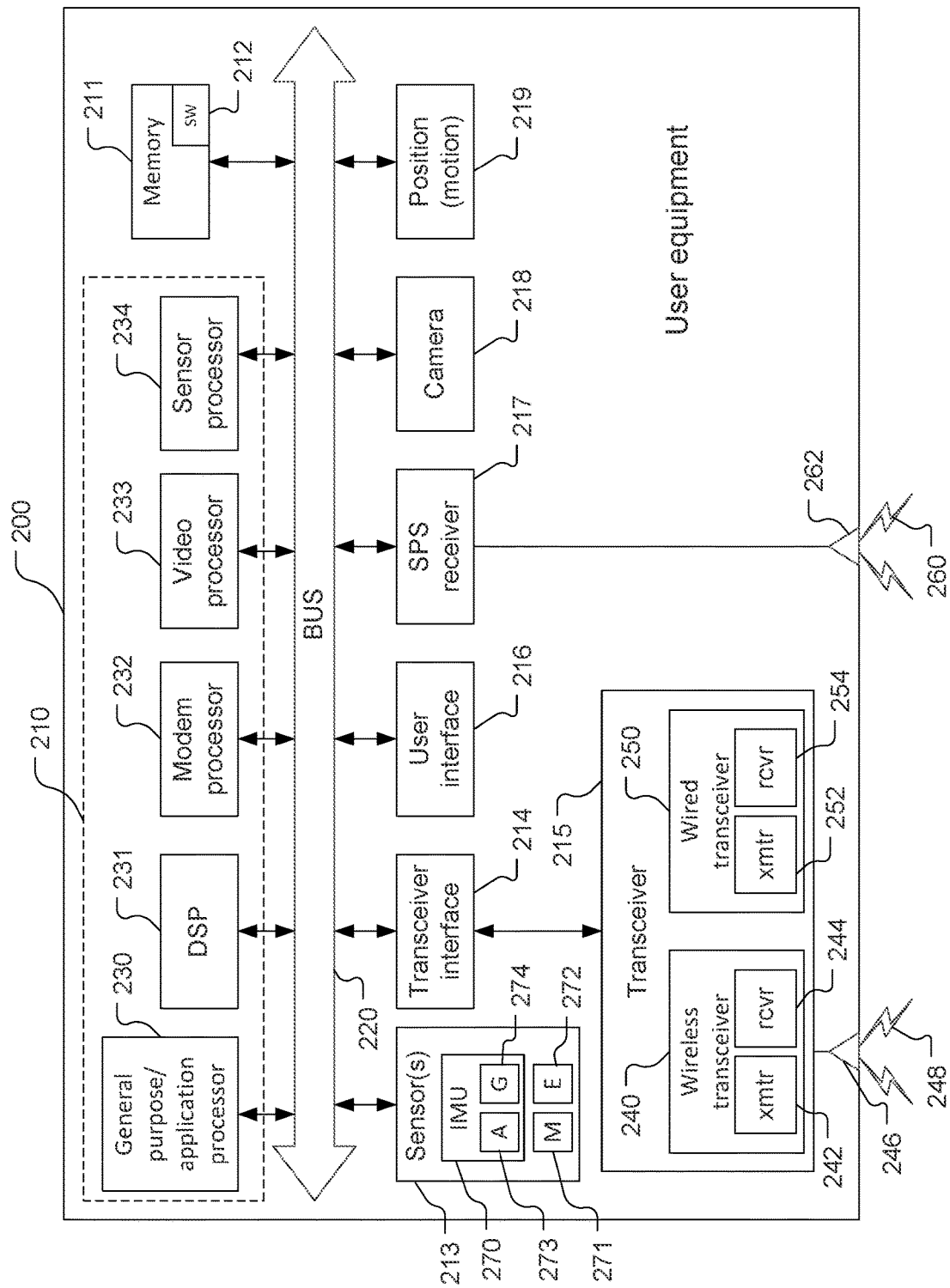
FIG. 2 is a block diagram of components of an example user equipment shown in FIG. 1.

Referring also to FIG. 2, a UE 200 is an example of the UE 105 and comprises a computing platform including a processor 210, memory 211 including software (SW) 212, one or more sensors 213, a transceiver interface 214 for a transceiver 215 (that includes a wireless transceiver 240 and/or a wired transceiver 250), a user interface 216, a Satellite Positioning System (SPS) receiver 217, a camera 218, and a position (motion) device 219. The processor 210, the memory 211, the sensor(s) 213, the transceiver interface 214, the user interface 216, the SPS receiver 217, the camera 218, and the position (motion) device 219 may be communicatively coupled to each other by a bus 220 (which may be configured, e.g., for optical and/or electrical communication). One or more of the shown apparatus (e.g., the camera 218, the position (motion) device 219, and/or one or more of the sensor(s) 213, etc.) may be omitted from the UE 200. The processor 210 may include one or more intelligent hardware devices, e.g., a central processing unit (CPU), a microcontroller, an application specific integrated circuit (ASIC), etc. The processor 210 may comprise multiple processors including a general-purpose/application processor 230, a Digital Signal Processor (DSP) 231, a modem processor 232, a video processor 233, and/or a sensor processor 234. One or more of the processors 230-234 may comprise multiple devices (e.g., multiple processors). For example, the sensor processor 234 may comprise, e.g., processors for radar, ultrasound, and/or lidar, etc. The modem processor 232 may support dual SIM/dual connectivity (or even more SIMs). For example, a SIM (Subscriber Identity Module or Subscriber Identification Module) may be used by an Original Equipment Manufacturer (OEM), and another SIM may be used by an end user of the UE 200 for connectivity. The memory 211 is a non-transitory storage medium that may include random access memory (RAM), flash memory, disc memory, and/or read-only memory (ROM), etc. The memory 211 stores the software 212 which may be processor-readable, processor-executable software code containing instructions that are configured to, when executed, cause the processor 210 to perform various functions described herein. Alternatively, the software 212 may not be directly executable by the processor 210 but may be configured to cause the processor 210, e.g., when compiled and executed, to perform the functions. The description may refer to the processor 210 performing a function, but this includes other implementations such as where the processor 210 executes software and/or firmware. The description may refer to the processor 210 performing a function as shorthand for one or more of the processors 230-234 performing the function. The description may refer to the UE 200 performing a function as shorthand for one or more appropriate components of the UE 200 performing the function. The processor 210 may include a memory with stored instructions in addition to and/or instead of the memory 211. Functionality of the processor 210 is discussed more fully below.

The configuration of the UE 200 shown in FIG. 2 is an example and not limiting of the disclosure, including the claims, and other configurations may be used. For example, an example configuration of the UE includes one or more of the processors 230-234 of the processor 210, the memory 211, and the wireless transceiver 240. Other example configurations include one or more of the processors 230-234 of the processor 210, the memory 211, the wireless transceiver 240, and one or more of the sensor(s) 213, the user interface 216, the SPS receiver 217, the camera 218, the PMD 219, and/or the wired transceiver 250.

The UE 200 may comprise the modem processor 232 that may be capable of performing baseband processing of signals received and down-converted by the transceiver 215 and/or the SPS receiver 217. The modem processor 232 may perform baseband processing of signals to be upconverted for transmission by the transceiver 215. Also or alternatively, baseband processing may be performed by the general-purpose processor 230 and/or the DSP 231. Other configurations, however, may be used to perform baseband processing.

The UE 200 may include the sensor(s) 213 that may include, for example, an Inertial Measurement Unit (IMU) 270, one or more magnetometers 271, and/or one or more environment sensors 272. The IMU 270 may comprise one or more inertial sensors, for example, one or more accelerometers 273 (e.g., collectively responding to acceleration of the UE 200 in three dimensions) and/or one or more gyroscopes 274. The magnetometer(s) may provide measurements to determine orientation (e.g., relative to magnetic north and/or true north) that may be used for any of a variety of purposes, e.g., to support one or more compass applications. The environment sensor(s) 272 may comprise, for example, one or more temperature sensors, one or more barometric pressure sensors, one or more ambient light sensors, one or more camera imagers, and/or one or more microphones, etc. The sensor(s) 213 may generate analog and/or digital signals indications of which may be stored in the memory 211 and processed by the DSP 231 and/or the general-purpose processor 230 in support of one or more applications such as, for example, applications directed to positioning and/or navigation operations.

The sensor(s) 213 may be used in relative location measurements, relative location determination, motion determination, etc. Information detected by the sensor(s) 213 may be used for motion detection, relative displacement, dead reckoning, sensor-based location determination, and/or sensor-assisted location determination. The sensor(s) 213 may be useful to determine whether the UE 200 is fixed (stationary) or mobile and/or whether to report certain useful information to the LMF 120 regarding the mobility of the UE 200. For example, based on the information obtained/measured by the sensor(s) 213, the UE 200 may notify/report to the LMF 120 that the UE 200 has detected movements or that the UE 200 has moved, and report the relative displacement/distance (e.g., via dead reckoning, or sensor-based location determination, or sensor-assisted location determination enabled by the sensor(s) 213). In another example, for relative positioning information, the sensors/IMU can be used to determine the angle and/or orientation of the other device with respect to the UE 200, etc.

The IMU 270 may be configured to provide measurements about a direction of motion and/or a speed of motion of the UE 200, which may be used in relative location determination. For example, the one or more accelerometers 273 and/or the one or more gyroscopes 274 of the IMU 270 may detect, respectively, a linear acceleration and a speed of rotation of the UE 200. The linear acceleration and speed of rotation measurements of the UE 200 may be integrated over time to determine an instantaneous direction of motion as well as a displacement of the UE 200. The instantaneous direction of motion and the displacement may be integrated to track a location of the UE 200. For example, a reference location of the UE 200 may be determined, e.g., using the SPS receiver 217 (and/or by some other means) for a moment in time and measurements from the accelerometer(s) 273 and gyroscope(s) 274 taken after this moment in time may be used in dead reckoning to determine present location of the UE 200 based on movement (direction and distance) of the UE 200 relative to the reference location.

The magnetometer(s) 271 may determine magnetic field strengths in different directions which may be used to determine orientation of the UE 200. For example, the orientation may be used to provide a digital compass for the UE 200. The magnetometer(s) 271 may include a two-dimensional magnetometer configured to detect and provide indications of magnetic field strength in two orthogonal dimensions. Also or alternatively, the magnetometer(s) 271 may include a three-dimensional magnetometer configured to detect and provide indications of magnetic field strength in three orthogonal dimensions. The magnetometer(s) 271 may provide means for sensing a magnetic field and providing indications of the magnetic field, e.g., to the processor 210.

The transceiver 215 may include a wireless transceiver 240 and a wired transceiver 250 configured to communicate with other devices through wireless connections and wired connections, respectively. For example, the wireless transceiver 240 may include a transmitter 242 and receiver 244 coupled to one or more antennas 246 for transmitting (e.g., on one or more uplink channels and/or one or more sidelink channels) and/or receiving (e.g., on one or more downlink channels and/or one or more sidelink channels) wireless signals 248 and transducing signals from the wireless signals 248 to wired (e.g., electrical and/or optical) signals and from wired (e.g., electrical and/or optical) signals to the wireless signals 248. Thus, the transmitter 242 may include multiple transmitters that may be discrete components or combined/integrated components, and/or the receiver 244 may include multiple receivers that may be discrete components or combined/integrated components. The wireless transceiver 240 may be configured to communicate signals (e.g., with TRPs and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE- V2X (PC5), V2C (Uu), IEEE 802.11 (including IEEE 802.11p), WiFi, WiFi Direct (WiFi-D), Bluetooth®, Zigbee etc. NR systems may be configured to operate on different frequency layers such as FR1 (e.g., 410-7125 MHz) and FR2 (e.g., 24.25-52.6 GHz), and may extend into new bands such as sub-6 GHz and/or 100 GHz and higher (e.g., FR2x, FR3, FR4). The wired transceiver 250 may include a transmitter 252 and a receiver 254 configured for wired communication, e.g., with the NG-RAN 135 to send communications to, and receive communications from, the gNB 110a, for example. The transmitter 252 may include multiple transmitters that may be discrete components or combined/integrated components, and/or the receiver 254 may include multiple receivers that may be discrete components or combined/integrated components. The wired transceiver 250 may be configured, e.g., for optical communication and/or electrical communication. The transceiver 215 may be communicatively coupled to the transceiver interface 214, e.g., by optical and/or electrical connection. The transceiver interface 214 may be at least partially integrated with the transceiver 215.

The user interface 216 may comprise one or more of several devices such as, for example, a speaker, microphone, display device, vibration device, keyboard, touch screen, etc. The user interface 216 may include more than one of any of these devices. The user interface 216 may be configured to enable a user to interact with one or more applications hosted by the UE 200. For example, the user interface 216 may store indications of analog and/or digital signals in the memory 211 to be processed by DSP 231 and/or the general-purpose processor 230 in response to action from a user. Similarly, applications hosted on the UE 200 may store indications of analog and/or digital signals in the memory 211 to present an output signal to a user. The user interface 216 may include an audio input/output (I/O) device comprising, for example, a speaker, a microphone, digital-to-analog circuitry, analog-to-digital circuitry, an amplifier and/or gain control circuitry (including more than one of any of these devices). Other configurations of an audio I/O device may be used. Also or alternatively, the user interface 216 may comprise one or more touch sensors responsive to touching and/or pressure, e.g., on a keyboard and/or touch screen of the user interface 216.

The SPS receiver 217 (e.g., a Global Positioning System (GPS) receiver) may be capable of receiving and acquiring SPS signals 260 via an SPS antenna 262. The antenna 262 is configured to transduce the wireless SPS signals 260 to wired signals, e.g., electrical or optical signals, and may be integrated with the antenna 246. The SPS receiver 217 may be configured to process, in whole or in part, the acquired SPS signals 260 for estimating a location of the UE 200. For example, the SPS receiver 217 may be configured to determine location of the UE 200 by trilateration using the SPS signals 260. The general-purpose processor 230, the memory 211, the DSP 231 and/or one or more specialized processors (not shown) may be utilized to process acquired SPS signals, in whole or in part, and/or to calculate an estimated location of the UE 200, in conjunction with the SPS receiver 217. The memory 211 may store indications (e.g., measurements) of the SPS signals 260 and/or other signals (e.g., signals acquired from the wireless transceiver 240) for use in performing positioning operations. The general-purpose processor 230, the DSP 231, and/or one or more specialized processors, and/or the memory 211 may provide or support a location engine for use in processing measurements to estimate a location of the UE 200.

The UE 200 may include the camera 218 for capturing still or moving imagery. The camera 218 may comprise, for example, an imaging sensor (e.g., a charge coupled device or a CMOS imager), a lens, analog-to-digital circuitry, frame buffers, etc. Additional processing, conditioning, encoding, and/or compression of signals representing captured images may be performed by the general-purpose processor 230 and/or the DSP 231. Also or alternatively, the video processor 233 may perform conditioning, encoding, compression, and/or manipulation of signals representing captured images. The video processor 233 may decode/decompress stored image data for presentation on a display device (not shown), e.g., of the user interface 216.

The position (motion) device (PMD) 219 may be configured to determine a position and possibly motion of the UE 200. For example, the PMD 219 may communicate with, and/or include some or all of, the SPS receiver 217. The PMD 219 may also or alternatively be configured to determine location of the UE 200 using terrestrial-based signals (e.g., at least some of the signals 248) for trilateration, for assistance with obtaining and using the SPS signals 260, or both. The PMD 219 may be configured to use one or more other techniques (e.g., relying on the UE's self-reported location (e.g., part of the UE's position beacon)) for determining the location of the UE 200, and may use a combination of techniques (e.g., SPS and terrestrial positioning signals) to determine the location of the UE 200. The PMD 219 may include one or more of the sensors 213 (e.g., gyroscope(s), accelerometer(s), magnetometer(s), etc.) that may sense orientation and/or motion of the UE 200 and provide indications thereof that the processor 210 (e.g., the general-purpose processor 230 and/or the DSP 231) may be configured to use to determine motion (e.g., a velocity vector and/or an acceleration vector) of the UE 200. The PMD 219 may be configured to provide indications of uncertainty and/or error in the determined position and/or motion.

Figure 3:
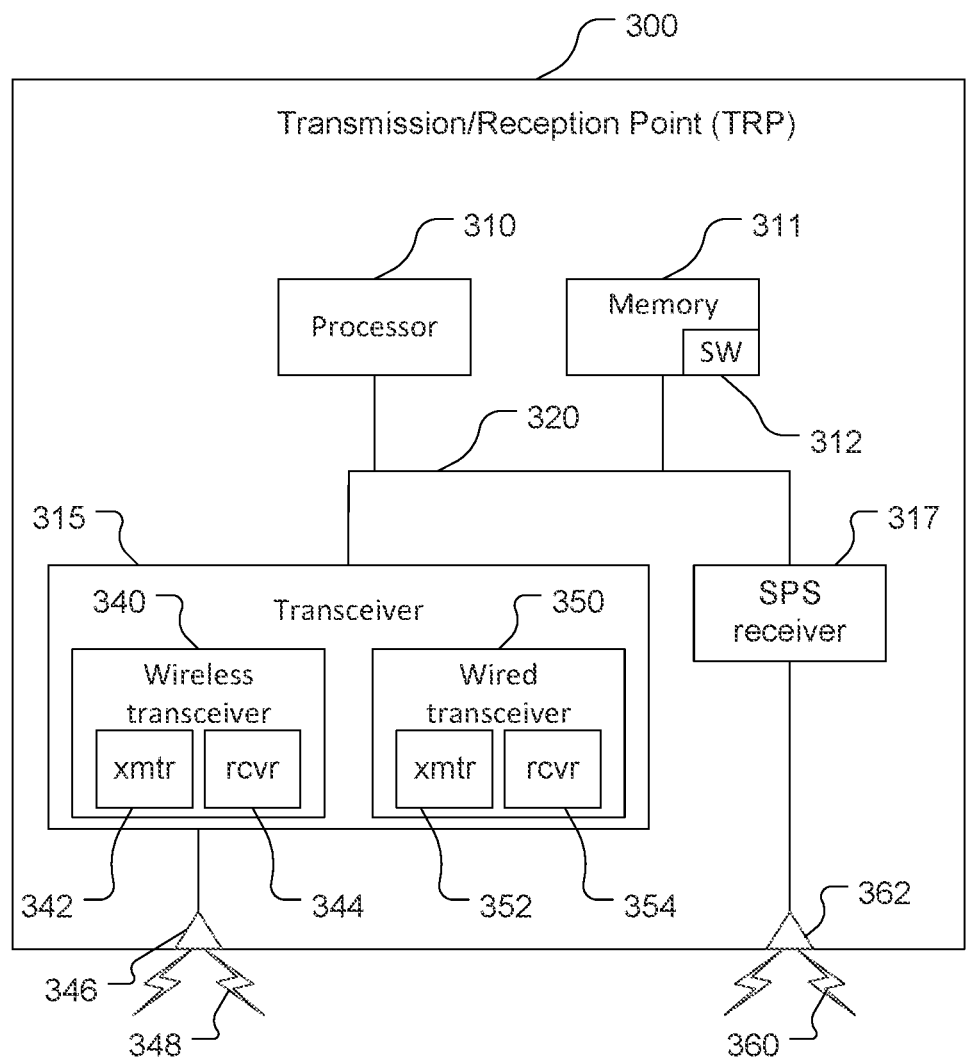
FIG. 3 is a block diagram of components of an example transmission/reception point shown in FIG. 1.

Referring also to FIG. 3, an example of a TRP 300 such as the gNB 110a, gNB 110b, ng-eNB 114 comprises a computing platform including a processor 310, memory 311 including software (SW) 312, a transceiver 315, and (optionally) an SPS receiver 317. The processor 310, the memory 311, the transceiver 315, and the SPS receiver 317 may be communicatively coupled to each other by a bus 320 (which may be configured, e.g., for optical and/or electrical communication). One or more of the shown apparatus (e.g., a wireless interface and/or the SPS receiver 317) may be omitted from the TRP 300. The SPS receiver 317 may be configured similarly to the SPS receiver 217 to be capable of receiving and acquiring SPS signals 360 via an SPS antenna 362. The processor 310 may include one or more intelligent hardware devices, e.g., a central processing unit (CPU), a microcontroller, an application specific integrated circuit (ASIC), etc. The processor 310 may comprise multiple processors (e.g., including a general-purpose/application processor, a DSP, a modem processor, a video processor, and/or a sensor processor as shown in FIG. 2). The memory 311 is a non-transitory storage medium that may include random access memory (RAM)), flash memory, disc memory, and/or read-only memory (ROM), etc. The memory 311 stores the software 312 which may be processor-readable, processor-executable software code containing instructions that are configured to, when executed, cause the processor 310 to perform various functions described herein. Alternatively, the software 312 may not be directly executable by the processor 310 but may be configured to cause the processor 310, e.g., when compiled and executed, to perform the functions. The description may refer to the processor 310 performing a function, but this includes other implementations such as where the processor 310 executes software and/or firmware. The description may refer to the processor 310 performing a function as shorthand for one or more of the processors contained in the processor 310 performing the function. The description may refer to the TRP 300 performing a function as shorthand for one or more appropriate components of the TRP 300 (and thus of one of the gNB 110a, gNB 110b, gNB 114) performing the function. The processor 310 may include a memory with stored instructions in addition to and/or instead of the memory 311. Functionality of the processor 310 is discussed more fully below.

The transceiver 315 may include a wireless transceiver 340 and/or a wired transceiver 350 configured to communicate with other devices through wireless connections and wired connections, respectively. For example, the wireless transceiver 340 may include a transmitter 342 and receiver 344 coupled to one or more antennas 346 for transmitting (e.g., on one or more uplink, downlink, and/or sidelink channels) and/or receiving (e.g., on one or more downlink, uplink and/or sidelink channels) wireless signals 348 and transducing signals from the wireless signals 348 to wired (e.g., electrical and/or optical) signals and from wired (e.g., electrical and/or optical) signals to the wireless signals 348. Thus, the transmitter 342 may include multiple transmitters that may be discrete components or combined/integrated components, and/or the receiver 344 may include multiple receivers that may be discrete components or combined/integrated components. The wireless transceiver 340 may be configured to communicate signals (e.g., with the UE 200, one or more other UEs, and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. The wired transceiver 350 may include a transmitter 352 and a receiver 354 configured for wired communication, e.g., with the network 140 to send communications to, and receive communications from, the LMF 120 or other network server, for example. The transmitter 352 may include multiple transmitters that may be discrete components or combined/integrated components, and/or the receiver 354 may include multiple receivers that may be discrete components or combined/integrated components. The wired transceiver 350 may be configured, e.g., for optical communication and/or electrical communication.

The configuration of the TRP 300 shown in FIG. 3 is an example and not limiting of the disclosure, including the claims, and other configurations may be used. For example, the description herein discusses that the TRP 300 is configured to perform or performs several functions, but one or more of these functions may be performed by the LMF 120 and/or the UE 200 (i.e., the LMF 120 and/or the UE 200 may be configured to perform one or more of these functions).

Figure 4:
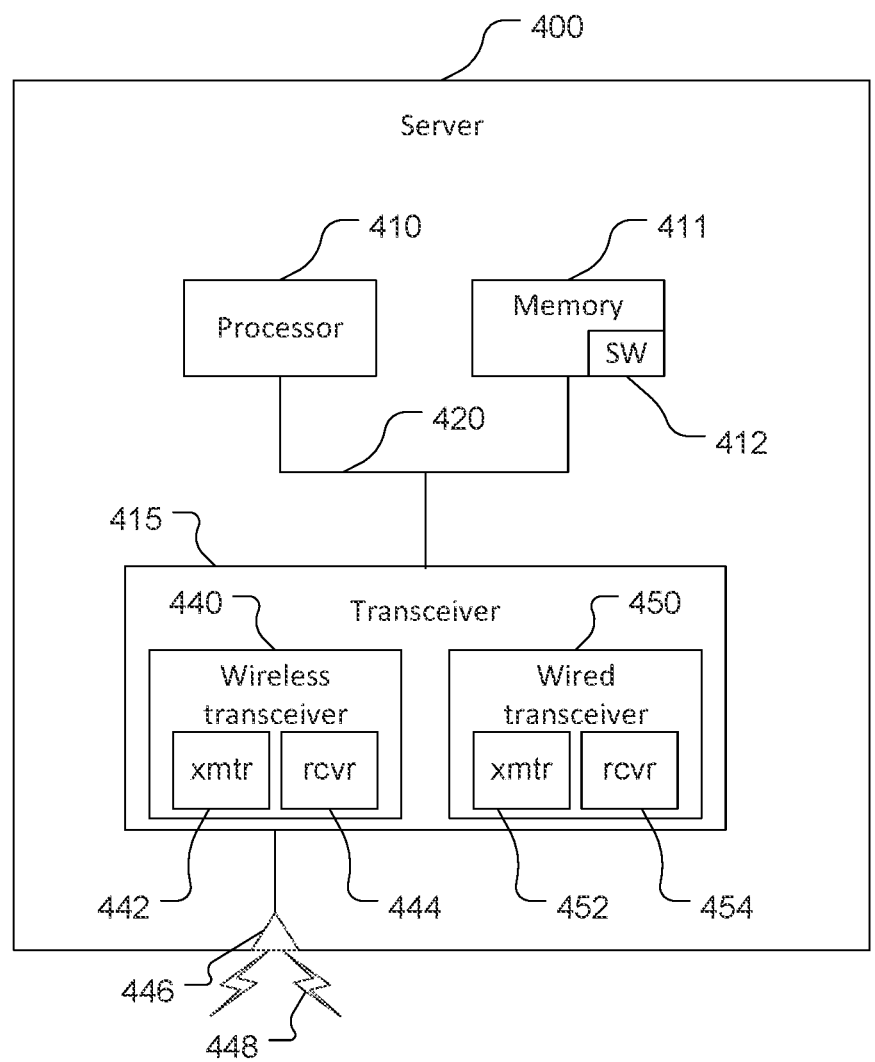
FIG. 4 is a block diagram of components of an example server shown in FIG. 1.

Referring also to FIG. 4, an example server, such as the LMF 120, comprises a computing platform including a processor 410, memory 411 including software (SW) 412, and a transceiver 415. The processor 410, the memory 411, and the transceiver 415 may be communicatively coupled to each other by a bus 420 (which may be configured, e.g., for optical and/or electrical communication). One or more of the shown apparatus (e.g., a wireless interface) may be omitted from the server 400. The processor 410 may include one or more intelligent hardware devices, e.g., a central processing unit (CPU), a microcontroller, an application specific integrated circuit (ASIC), etc. The processor 410 may comprise multiple processors (e.g., including a general-purpose/application processor, a DSP, a modem processor, a video processor, and/or a sensor processor as shown in FIG. 2). The memory 411 is a non-transitory storage medium that may include random access memory (RAM)), flash memory, disc memory, and/or read-only memory (ROM), etc. The memory 411 stores the software 412 which may be processor-readable, processor-executable software code containing instructions that are configured to, when executed, cause the processor 410 to perform various functions described herein. Alternatively, the software 412 may not be directly executable by the processor 410 but may be configured to cause the processor 410, e.g., when compiled and executed, to perform the functions. The description may refer to the processor 410 performing a function, but this includes other implementations such as where the processor 410 executes software and/or firmware. The description may refer to the processor 410 performing a function as shorthand for one or more of the processors contained in the processor 410 performing the function. The description may refer to the server 400 (or the LMF 120) performing a function as shorthand for one or more appropriate components of the server 400 performing the function. The processor 410 may include a memory with stored instructions in addition to and/or instead of the memory 411. Functionality of the processor 410 is discussed more fully below.

The transceiver 415 may include a wireless transceiver 440 and/or a wired transceiver 450 configured to communicate with other devices through wireless connections and wired connections, respectively. For example, the wireless transceiver 440 may include a transmitter 442 and receiver 444 coupled to one or more antennas 446 for transmitting (e.g., on one or more downlink channels) and/or receiving (e.g., on one or more uplink channels) wireless signals 448 and transducing signals from the wireless signals 448 to wired (e.g., electrical and/or optical) signals and from wired (e.g., electrical and/or optical) signals to the wireless signals 448. Thus, the transmitter 442 may include multiple transmitters that may be discrete components or combined/integrated components, and/or the receiver 444 may include multiple receivers that may be discrete components or combined/integrated components. The wireless transceiver 440 may be configured to communicate signals (e.g., with the UE 200, one or more other UEs, and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. The wired transceiver 450 may include a transmitter 452 and a receiver 454 configured for wired communication, e.g., with the NG-RAN 135 to send communications to, and receive communications from, the TRP 300, for example. The transmitter 452 may include multiple transmitters that may be discrete components or combined/integrated components, and/or the receiver 454 may include multiple receivers that may be discrete components or combined/integrated components. The wired transceiver 450 may be configured, e.g., for optical communication and/or electrical communication.

The configuration of the server 400 shown in FIG. 4 is an example and not limiting of the disclosure, including the claims, and other configurations may be used. For example, the wireless transceiver 440 may be omitted. Also or alternatively, the description herein discusses that the server 400 is configured to perform or performs several functions, but one or more of these functions may be performed by the TRP 300 and/or the UE 200 (i.e., the TRP 300 and/or the UE 200 may be configured to perform one or more of these functions).

Figure 5:
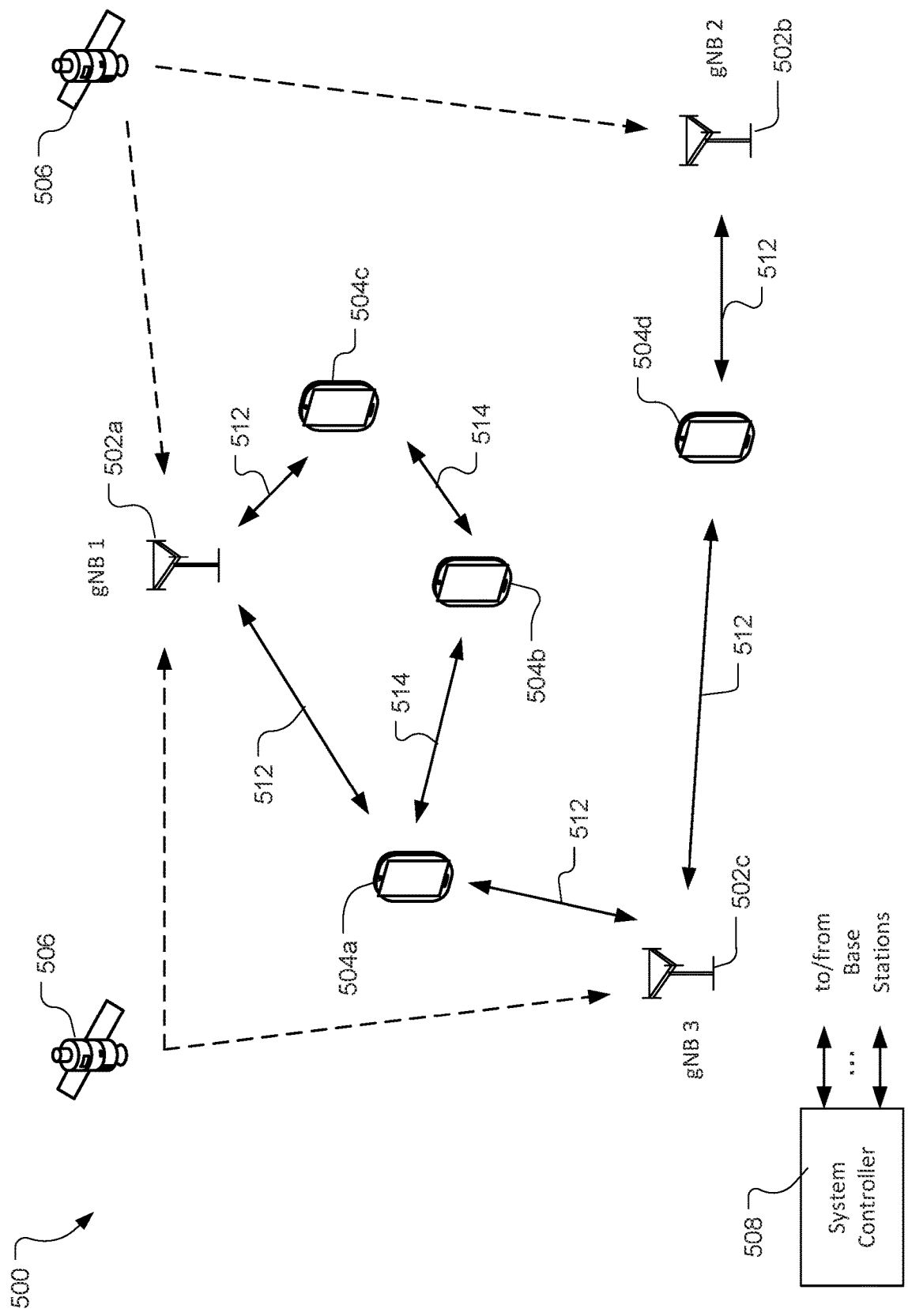
FIG. 5 is a diagram of an example wireless network with a plurality of nodes.

Referring to FIG. 5, an example wireless network 500 with a plurality of nodes is shown. The plurality of nodes may include base stations, such as a first base station 502a, a second base station 502b, and a third base station 502c. Each of the base stations 502a-c may include some or all of the components of the TRP 300, and the TRP 300 may be an example of a base station. In an example, the base stations 502a-c may be included in the NG-RAN 135 such as the gNBs 110a-b and the ng-eNB 114. Each of the base stations 502a-c may provide communication coverage for a particular geographic area. To improve system capacity, the overall coverage area of a base station may be partitioned into multiple (e.g., three) smaller areas. Each smaller area may be served by a respective base station subsystem. The network 500 also includes a plurality of mobile nodes such as a first UE 504a, a second UE 504b, a third UE 504c, and a fourth UE 504d. Each of the UEs 504a-d may include some or all of the components of the UE 200, and the UE 200 may be an example of a UE in the network 500. Other nodes, such as roadside units (RSUs) and Access Points (APs) may also be included in the network 500. The UEs 504a-d may be configured to communicate with the base stations 502a-c via the forward and reverse links 512. The forward link (or downlink) refers to the communication link from a base station to a UE, and the reverse link (or uplink) refers to the communication link from a UE to a base station. The UEs 504a-d may also be configured to communicate with one another via D2D sidelink messages 514. For example, in a 5G network, the sidelink connection 514 may include one or more channels such as a Physical Sidelink Shared Channel (PSSCH), a Physical Sidelink Control Channel (PSCCH), a Physical Sidelink Broadcast Channel (PSBCH), a Sidelink Shared Channel (SL-SCH), and/or other sidelink broadcast channels and synchronization signals.

A system controller 508 may couple to the set of base stations 502a-c and provide coordination and control for the base stations. System controller 508 may be a single network entity or a collection of network entities. For example, the system controller may include one or more nodes in the 5GC 140 such as the AMF 115 and the LMF 120. The system controller 508 may be an Integrated Access and Backhaul (IAB) node, such as a Central Unit (CU) or Donor Unit (DU).

The nodes in the network 500, including the base stations 502a-d, the UEs 504a-c and the system controller 508, may be configured to receive signals from one or more satellites 506, which may be part of the United States Global Positioning System (GPS), the European Galileo system, the Russian GLONASS system, or some other GNSS. The network nodes may obtain accurate timing information from the satellites and may adjust its timing based on this accurate timing information. All cells in the base station typically have the timing of the base station. The network 500 may support synchronous operation, or asynchronous operation, or either synchronous or asynchronous operation. Synchronous operation may also be referred to as a globally synchronous (GS) mode, and asynchronous operation may also be referred to as a globally asynchronous (GA) mode. The GS mode may assume accurate synchronization of the nodes with respect to a reference time source, e.g., GPS or some other GNSS.

Figure 6:
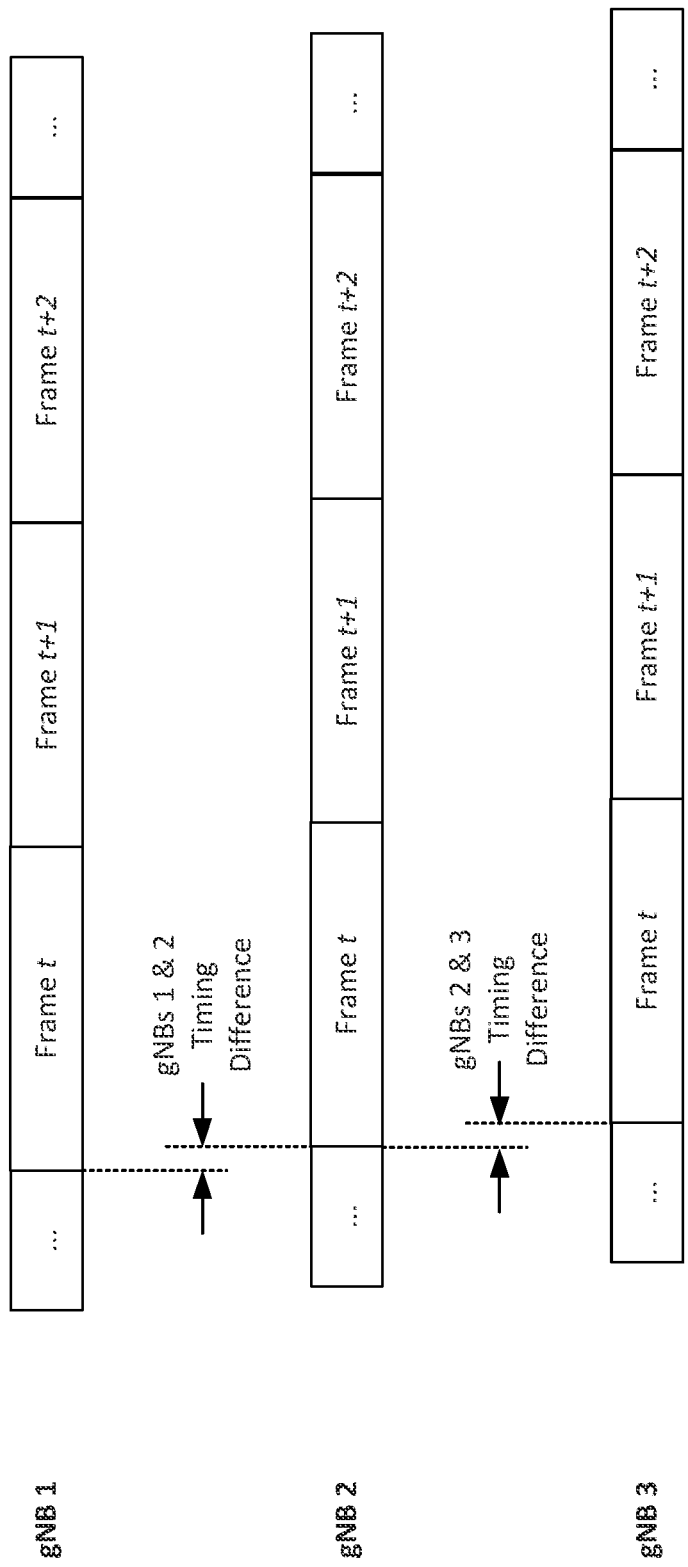
FIG. 6 is an example timing diagram of synchronous operation by three nodes.

Referring to FIG. 6, a synchronous operation by three nodes is shown. The three nodes include a first base station gNB1, a second base station gNB2, and a third base station gNB3. The transmission timeline may be partitioned into units of radio frames. Each radio frame may span a particular time duration, e.g., 10 milliseconds (ms), and may be assigned a frame number. The frame number may be reset to 0 at a specific time, incremented by one for each radio frame thereafter, and wrap around to zero after reaching a maximum value. For synchronous operation, the timing of each node may closely match the timing of neighbor nodes, and the timing difference between adjacent nodes may be required to meet certain requirements. For example, the timing of a cell may be typically less than 3 microseconds (μsecs) and no greater than 10 μsecs from the timing of the neighbor cells.

Synchronous operation may have certain advantages over asynchronous operation. For example, synchronous operation may improve system capacity due to synchronized interference across nodes, synchronized control channels across nodes, faster handoff due to node switching based on re-pointing instead of random access, etc. Synchronous operation may also reduce the complexity of node searches since the timing of undetected nodes may be inferred from the timing of detected nodes. A UE may thus perform node searches over a smaller window around the known timing of a detected node instead of over all possible timing hypotheses.

However, synchronous operation may be associated with additional costs in order to maintain accurate time synchronization. Stringent synchronization accuracy requirements (e.g., better than 3 μsecs typically and no worse than 10 μsecs most of the time) may be achieved with a GNSS receiver as well as a very accurate oscillator at a base station. The GNSS receiver may be used to obtain accurate timing information from satellites, which may be used to update the timing of the nodes (e.g., cells) in the base station. The very accurate oscillator may be used to maintain precise timing for the base station in case of a temporary loss of satellite signals due to a GNSS outage. For example, the base station may be required to maintain synchronization accuracy (e.g., of 10 μsecs or better) without any satellite signals for a specified holdover duration (e.g., of eight hours). These stringent holdover requirements may be met with the very accurate oscillator. This oscillator may have a very small frequency error and can then provide accurate timing within the required synchronization accuracy for the entire holdover duration.

In an embodiment, a network may be configured to react to a GNSS outage to reduce the dependency on the GNSS timing information and the accuracy of the oscillators in the nodes. For example, messaging protocols may be used to inform network nodes of a GNSS outage and the network may be configured to react to reduce the impact of a GNSS outage. In an example, reference signals and D2D sidelink procedures may be used to reestablish the timing in a node experiencing a GNSS timing source outage.

Figure 7:
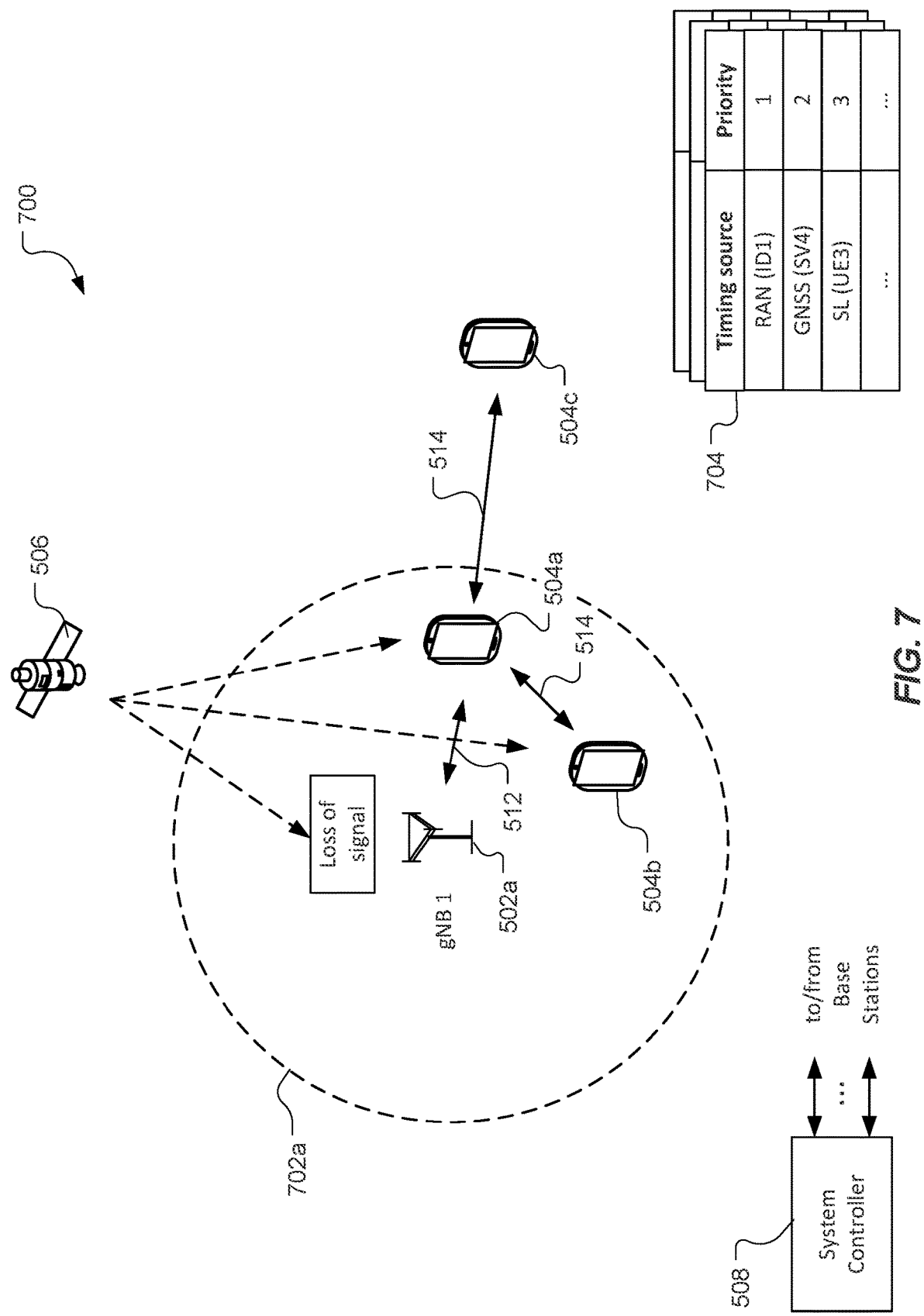
FIG. 7 is a diagram of an example network experiencing a timing source outage on a node.

Referring to FIG. 7, an example network 700 experiencing a timing source outage on a node is shown. The network 700 is an example and includes a plurality of the nodes described in the network 500 depicted in FIG. 5. In this example, the first base station 502a is experiencing a timing source outage due to a lack of a signal from the satellite 506. The loss of signal may be based on transmission issues associated with the satellite 506, environmental and/or atmospheric issues (e.g., solar flares), and/or issues associated with the SPS receiver 317 in the first base station 502*a*. The timing source outage impacting the first base station 502*a* may be detected by the first base station 502*a* (i.e., self-reporting), or by other nodes in the network. For example, the first UE 504*a* may have access to a timing source and may be configured detect an unacceptable timing difference based on reference signals exchanged with the first base station 502*a*. A coverage area 702*a* represents the coverage area of the first base station 502*a*. The first UE 504*a* and the second UE 504*b* are within the coverage area 702*a*, and the third UE 504*c* is outside of the coverage area 702*a*. The first UE 504*a* is communicating with the first base station 502*a* via a link 512, and with the UEs 504*b*, 504*c* via D2D sidelinks 514.

In an embodiment, the network nodes may be configured to inform other nodes in the network of the timing source outage being experienced by the first base station 502*a*. For example, one or more timing source outage messages may include information about the timing source outage and carried as part of a protocol between two nodes. A NRPPa protocol may be used by the first base station 502*a* to report the timing source outage to the system controller 508 (e.g., the LMF 120). The Radio Resource Control (RRC) protocol may be used to provide timing source outage information between the first base station and the first UE 504*a*. Other over-the-air (OTA) signaling such as Medium Access Control (MAC) Control Elements (CE), and Downlink Control Information (DCI) signaling may be used to provide one or more timing source outage notification information to the network nodes. The timing source outage information may be included in System Information Blocks (SIBs), other paging messages, or other dedicated OTA messages and/or broadcasts. D2D sidelink protocols may also be used to carry the timing source outage information between nodes. For example, the first UE 504*a* may be configured to relay the timing source outage notification information to the second and third UEs 504*b*, 504*c* via the D2D sidelinks 514.

In operation, the UEs 504*a-c* may be configured to derive timing information from the GNSS time or from a RAN time. A base station, such as the first base station 502*a*, which is suffering a local timing outage (e.g., due to a malfunction in the SPS receiver) may be configured to derive timing information from one or more sidelink configured UEs which still have the GNSS time. For example, the first base station 502*a* may obtain the GNSS time on the first UE 504*a* via signals exchanged on the link 512. In an embodiment, upon detecting the timing source outage, the first base station 502*a* may configure the first UE 504*a* to switch from a RAN based time (i.e., the serving cell time provided by the first base station 502*a*) to the GNSS time (i.e., provided by the satellite 506). The first base station 502*a* may then obtain the GNSS time via the first UE 504*a*.

In an embodiment, the UEs may include a data structure such as timing source lists 704 to prioritize how a UE will derive a time reference. The timing source lists 704 may be obtained from the system controller 508, or other network resource, via network signaling (e.g., LPP, RRC, etc.) and stored in the memory 211. The timing source lists 704 may indicate a priority for different timing sources. The timing source lists 704 may include multiple lists such as one list for prioritizing GNSS-based timing sources (e.g., different satellites) and one list for RAN-based timing sources (e.g., gNB IDs, SL UEIDs). Using timing derived from a base station (e.g., gNB) may be an option in some or all of these timing source lists 704. This option may be further refined based on whether or not the base station is experiencing a timing source outage. For example, base stations affected by a timing source outage may be a separate item with lower priority on the timing source lists 704. The priority may be further defined based on the type of timing source outage, such as whether the outage is local or global, the duration of the expected outage, and/or other information elements in a timing source outage notification message. Further refinements on the priority value may be based on network configuration parameters (e.g., the serving cell ID, neighbor cell IDs, other network cell IDs). The timing source lists 704 may be propagated to other UEs in the network via D2D sidelink. For example, the first UE 504*a* may be configured to provide timing outage information associated with the first base station 502*a* and the timing source lists 704 to the second UE 504*b* and the third UE 504*c* (e.g., via D2D, PC5, or other sidelink protocols).

Figure 8:
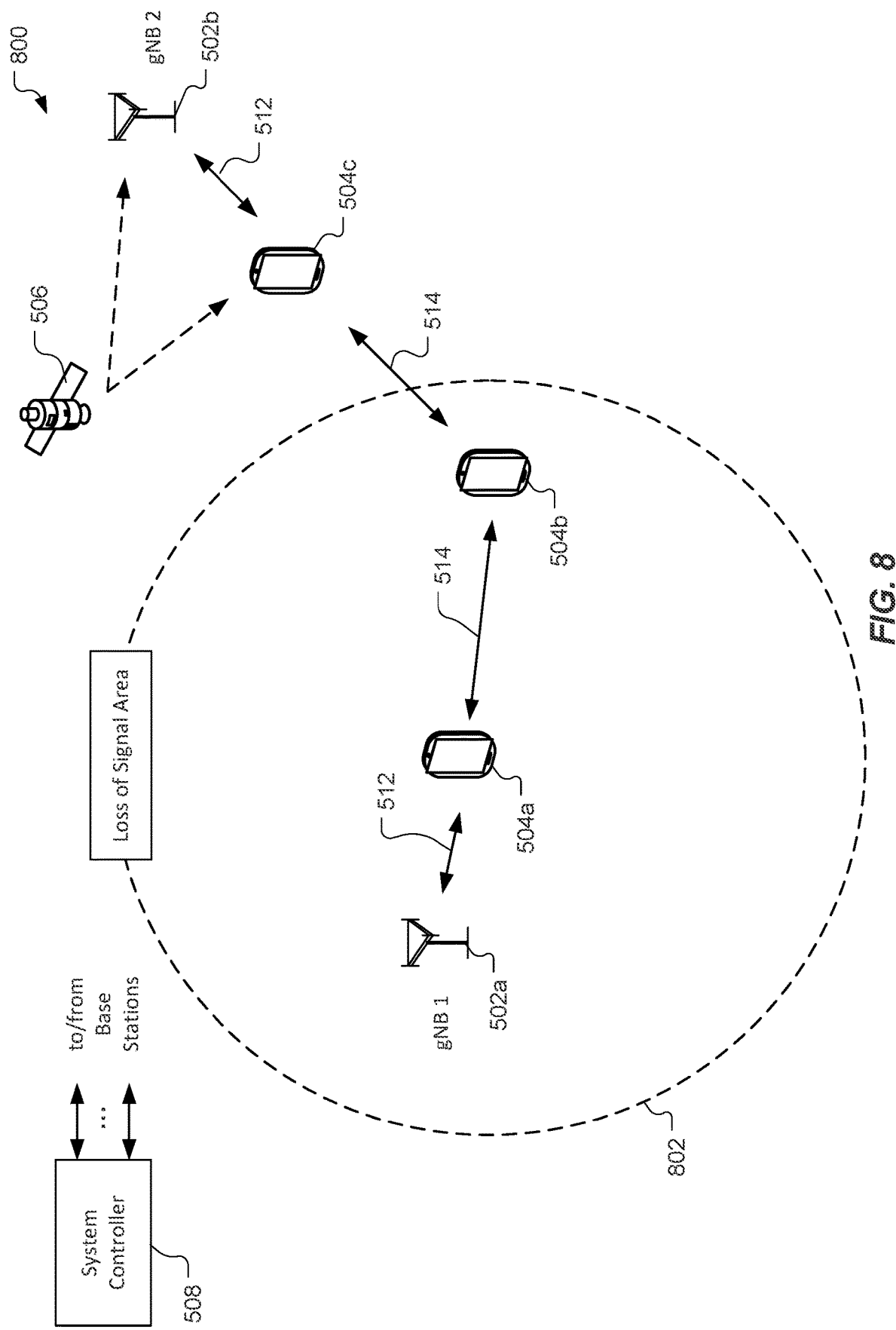
FIG. 8 is a diagram of an example network experiencing a wide area timing source outage.

Referring to FIG. 8, an example network 800 experiencing a wide area timing source outage is shown. The network 800 is an example and includes some of the nodes described in the network 500 depicted in FIG. 5. In this example, a wide area outage is creating an outage areas (e.g., the loss of signal area 802) which is impacting the timing sources of the first base station 502*a*, the first UE 504*a*, and the second UE 504*b*. The loss of signal area 802 may be based on the impact of a jamming signal, environmental factors (e.g., solar activity), or other malfunctions in a GNSS. As described in FIG. 7, a network node may inform one or more other nodes of the poor timing quality (e.g., due to a timing source outage). For example, the first base station 502*a* may notify the system controller 508, and/or other nodes (e.g., the first UE 504*a*) of the timing source outage. Similarly, the first and second UEs 504*a*, 504*b* may be configured to provide timing source outage notification messages to neighboring UEs (e.g., the third UE 504*c*) via sidelink channels or other cellular channels (e.g., via the cellular network Uu, LPP, NRPPa, etc.). The timing source outage information may be relayed via multiple nodes by an end-to-end protocol that is routed via the intermediate nodes, or by distinct protocols on the different intermediate links, with the intermediate nodes doing the mapping from one protocol to the next.

In an embodiment, the UEs 504*a-c* may utilize the sidelink communications to assist with services during the timing source outage. For example, during a timing source outage, the first base station 502*a* may operate with reduced functionality which may cause some UEs to lose coverage. For example, the second UE 504*b* may lose coverage due to the reduced functionality. In this example, the first base station 502*a* may configure sidelink relays (e.g., via the first UE 504*a*) to provide connectivity to the second UE 504*b*. In an embodiment, the system controller 508 may configured the sidelink relays via other base stations. For example, the second base station 502*b* may configure a sidelink relay to the second UE 504*b* via third UE 504*c*. In an example, the system controller 508 may determine the proximate base stations which have a valid timing source and then select a base station with a valid timing source to configure the relay to an out of coverage UE. The sidelink relays may be used to notify a remote UEs of the end of the timing source outage. UEs in an existing relay chains may be configured to update their relay-selection to avoid relays which may be connected to a base station affected by a timing source outage. In an example, a base station may be configured to query the UEs in a sidelink chain to determine if the individual UEs are experiencing a timing source outage to help find the scale of outage.

Figure 9:
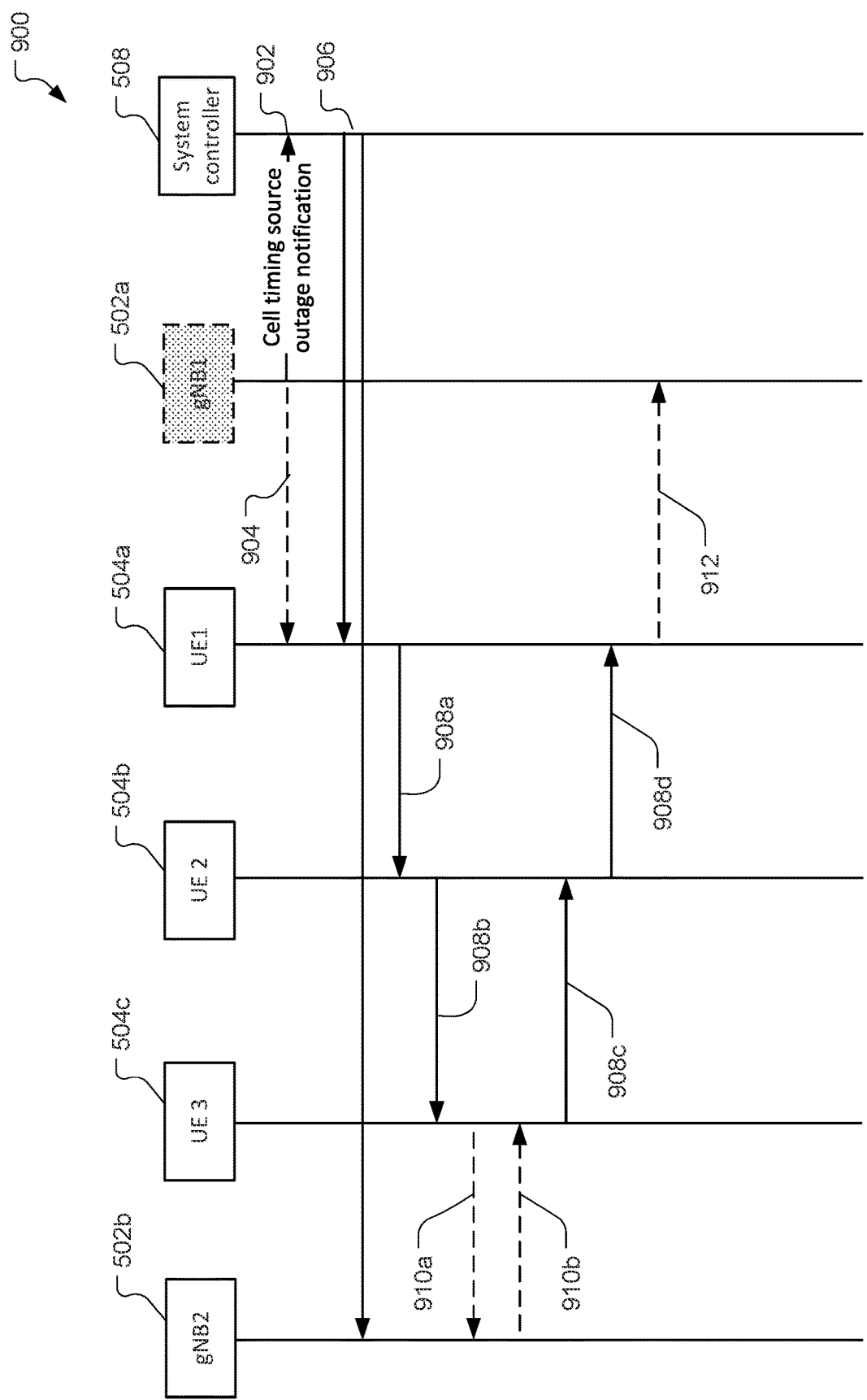
FIG. 9 is an example message flow for establishing a sidelink relay in response to a timing source outage.

Referring to FIG. 9, an example message flow 900 for establishing a sidelink relay in response to a timing source outage is shown. The message flow 900 includes some of the nodes described in FIG. 8. In general, the message flow 900 enables the propagation of information and system parameters via sidelink channels when a network station has incurred a timing source outage. For example, the first base station 502a may detect a timing outage based on the loss of a GNSS signals as depicted in the network 800. Based on the detection of the timing source outage, the first base station 502a may provide one or more timing source outage notification messages 902 to the system controller 508 (e.g., the LMF 120). In an example, the timing source outage notification messages 902 may utilize NRPPa protocols, or other network messaging protocols, and are configured to provide an indication of the timing source outage to the system controller 508. In addition to, or as an alternative to the timing source outage notification message 902, the first base station 502a may be configured to provide a timing source outage notification message 904 to one or more in-coverage UEs such as the first UE 504a. The timing source outage notification message 904 may utilize OTA signaling such as RRC, MAC-CE and/or DCI.

The system controller 508 may be configured to relay one or more information elements associated with the timing source outage information included in the timing source outage notification message 902 to other network nodes. For example, the system controller 508 may send one or more timing source outage information messages 906 to other base stations such as the second base station 502b, and in-coverage UEs (e.g., the first UE 504a). The system controller 508 may facilitate in configuring sidelink relays between in-coverage and out-of-coverage UEs. For example, the first UE 504a may receive an indication of proximate UEs configured for sidelink communications. The first UE 504a may be configured to perform a sidelink discovery procedure to enable a sidelink connection 514 with the second UE 504b. The first UE 504a may be configured to send/relay information to the second UE 504b such as the timing source outage information via sidelink message 908a. Similarly, the second UE 504b may enable a sidelink connection 514 with the third UE 504c and send/relay information to the third UE 504c such as a timing source outage information via sidelink message 908b. In an embodiment, the third UE 504c may be configured to send/relay the timing source outage information to the second base station 502b via uplink messages 910a, and receive downlink information via downlink messages 910b (e.g., RRC, MAC-CE, DCI, etc.). In an embodiment, the base stations and UEs may be configured to communicate via sidelink (e.g., UE to RSU via PC5). The third UE 504c may also send/relay information to the second UE 504b via sidelink messages 908c, and the second UE 504b may also send/relay the information to the first UE 504a via sidelink messages 908d. The first UE 504a may send/relay information to the first base station 502a via uplink messages 912.

In operation, the network nodes may be configured to react based on a receipt of the timing outage information. The reactions may vary based on the state of the node and the context associated with the timing outage. For example, in a mobility or handoff context, nodes experiencing a timing outage may be bypassed or deprioritized. In a positioning context, reference signals transmitted from an affected node may be ignored. The system controller 508 may mute one or more signals on an affected node to reduce the potential of time domain interference. Other reactions are also possible to mitigate the impact of the timing source outage. In an embodiment, the system controller 508 may be configure to provide services via the sidelink relays in the message flow 900. For example, the nodes with valid timing sources (e.g., the third UE 504c and the second base station 502b) may provide GNSS based time information to the nodes impacted by the timing source outage (e.g., the first and second UEs 504a-b, and the first base station 502a). Other services may include providing the affected nodes with reference signal configuration information for mobility and positioning application. For example, the system controller 508 may provide DL PRS and/or UL SRS configuration resource sets to the second UE 504b via the second base station 502b and the third UE 504c. Other connectivity and service related messages may be relayed to the stations impacted by the timing source outage.

Figure 10:
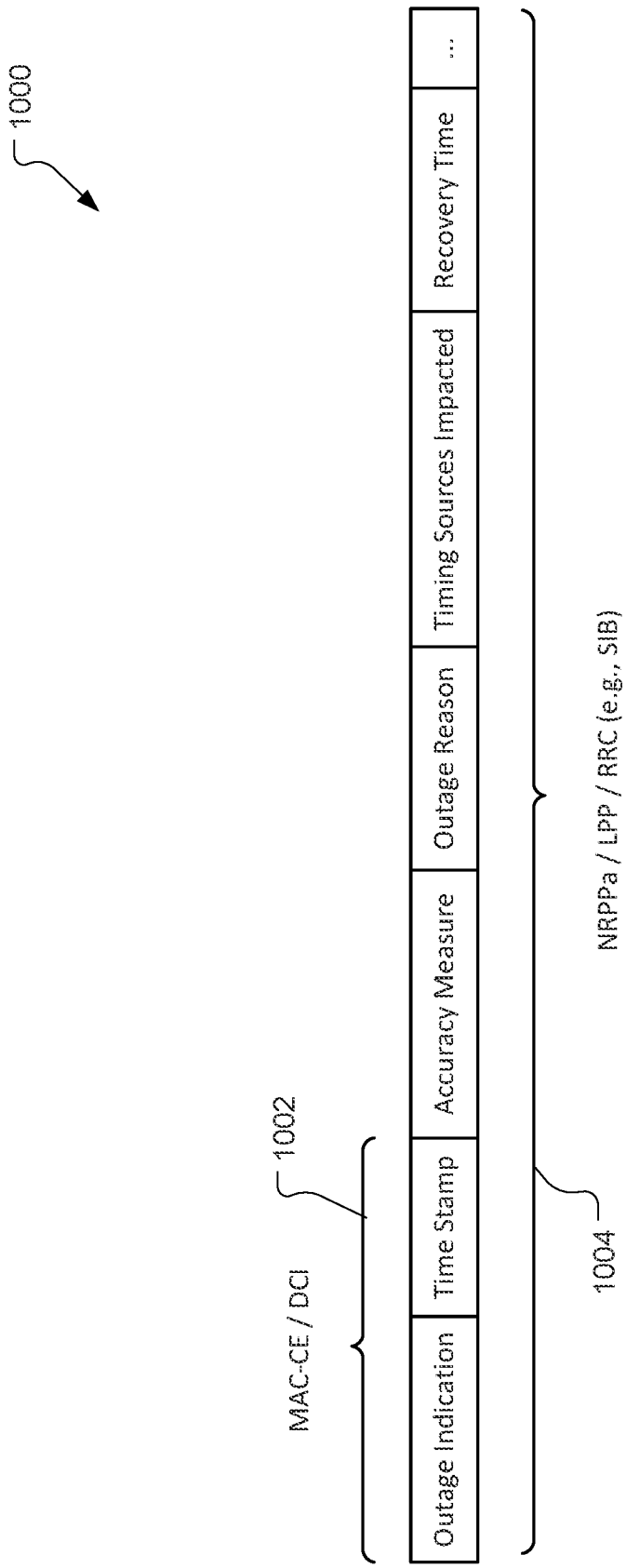
FIG. 10 is an example of information elements in timing source outage notification messages.

Referring to FIG. 10, example information elements in a timing source outage notification message 1000 are shown. In general, the timing source outage notification message 1000 contains details about the timing source outage event. For example, an outage indication information element (IE) may provide an indication that a station is experiencing a timing outage. The outage indication may include station identification information or other parameters to identify a node in the network. A time stamp IE may indicate when the timing source outage occurred and/or was detected. An accuracy measure IE may indicate a synchronization and/or timing accuracy measure and/or a timing drift value (e.g., indicating how much the timing is degraded). One or more outage reason IEs may indicate an estimated reason for the timing source outage. Timing sources impacted and recover time IEs may be used to indicate a scale of a timing source outage. For example, which nodes are impacted, which GNSS is/are impacted, how many satellites are impacted, the expected recovery time, etc. Other IEs may also be used by a network server (e.g., the LMF) to indicate the scale of a timing source outage. For example, whether the timing source failure is limited to a gNB, or to the gNB and N of its neighbors (e.g., based on messages received from those neighbors), or to the gNB and M of its neighbors based on the reported type of timing source outage, etc. The IEs in the timing source outage notification message 1000 are examples and not limitations as other IEs may also be used to provide details about the timing source outage.

In an embodiment, one or more rules may be implemented based on the context of the nodes sending and receiving timing source outage notification messages 1000. For example, an abbreviated timing source outage notification message 1002 may be used for certain high priority protocols such as MAC-CE and DCI where data payload constraints may limit the amount of data that may be included in a timing source outage notification message. The abbreviated timing source outage notification message 1002 may include the outage indication IE and a time stamp to enable a node to react to the timing source outage. For example, a UE may be configure to react by ignoring positioning reference signals transmitted from a station based on the outage indication. Other reactions may include modifying mobility and handoff procedures to reduce the impact of the timing source outage. For example, mobility sets, such as L1/L2 configured sets, may be modified to remove the impacted nodes, synchronous dual connectivity (DC) operations may be reconfigure to asynchronous, handover procedures and configurations may be modified, and dynamic spectrum sharing (DSS) operations may be suspended or reconfigured. Cross Link Interference (CLI) measurement procedures may also be reconfigured based on a timing source outage notification. An expanded timing source outage notification message 1004 may include additional IEs as compared to the abbreviated timing source outage notification message 1002. For example, other protocols such as NRPPa, LPP and RRC may be capable of providing an increased number of IEs and the associated details of the timing source outage. The receive nodes may be configured to react based on the additional IEs.

Figure 11:
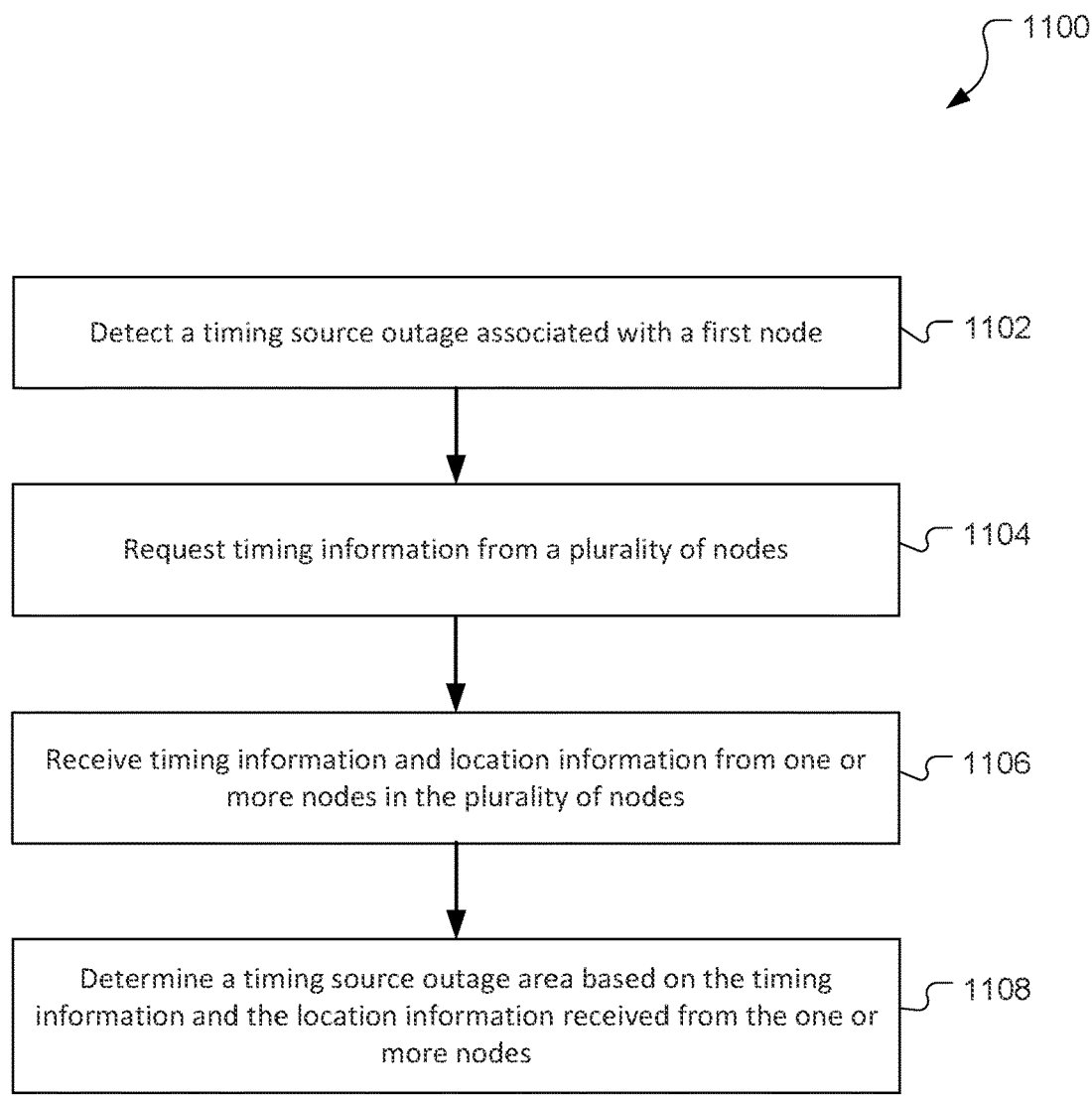
FIG. 11 is a process flow for an example method for determining a size of a timing source outage.

Referring to FIG. 11, with further reference to FIGS. 1-10, a method 1100 for determining a size of a timing source outage includes the stages shown. The method 1100 is, however, an example and not limiting. The method 1100 may be altered, e.g., by having stages added, removed, rearranged, combined, performed concurrently, and/or having single stages split into multiple stages.

At stage 1102, the method includes detecting a timing source outage associated with a first node. A server 400 such as an LMF 120, including a processor 410 and a transceiver 415, is a means for detecting the timing source outage. In an example, referring to FIG. 8, a TRP such as the first base station 502*a* may be configured to detect a timing outage based on GNSS signal decode failures. Such failures may be caused by transmission issues associated with one or more satellites, or SPS receiver issues in the TRP. In an embodiment, other network nodes such as UEs, may be configured to detect a timing outage based on reference signals transmitted from an impacted node (e.g., synchronization signals in excess of 10 μsecs), and provide a notification of the timing issues to the impacted TRP and/or other network nodes. The network nodes may be configured to provide the LMF 120 one or more timing source outage notification messages 902 to enable the LMF 120 to detect the timing source outage in a node.

At stage 1104, the method includes requesting timing information from a plurality of nodes. The server 400, including a processor 410 and a transceiver 415, is a means for requesting timing information from the plurality of nodes. In an example, the LMF 120 may relay one or more information elements associated with the timing source outage information included in the timing source outage notification message 902 to other network nodes. For example, the LMF 120 may send one or more timing source outage information messages 906 to the base stations 502*b*, 502*c* and in-coverage UEs (e.g., the first UE 504*a*, the third UE 504*c*). The timing source outage notification message 906 may utilize OTA signaling such as RRC, MAC-CE and/or DCI. The UEs may utilize D2D sidelink messages 514 to relay the timing source outage notification and receiving timing information from out-of-coverage UEs. The timing source outage message may include a request for timing source information. A node may be configured to verify the status of its timing source (e.g., GNSS signal, RAN based signal) in response to receiving a timing source outage notification message.

At stage 1106, the method includes receiving timing information and location information from one or more nodes in the plurality of nodes. The server 400, including a processor 410 and a transceiver 415, is a means for receiving timing and location information. In an embodiment, the LMF 120 may receive responses to the requests sent at stage 1104. The responses may include an indication of whether the node has a valid timing source (i.e., is not suffering an outage) or if it does not have a valid timing source (i.e., is suffering an outage). The response may also include a current location of the node. The current location may be based on memory (e.g., a previously determined location for non-mobile devices and/or nodes experiencing a timing outage), or may be determined based on a terrestrial and/or satellite positioning technique if possible. A position based on inertial navigation (e.g., via the IMU 270) may be used in the location information. Other location relevant information such as a serving cell ID, or E-CID information may be provided as the location information. For example, in the network 800, the first UE 504*a* and the second UE 504*b* may provide an indication that they are experiencing a timing source outage as well as their respective location estimates. The third UE 504*c* may provide an indication that it has a valid timing source (e.g., satellite 506 and/or the RAN time via the second base station 502*b*). The second base station 502*b* may also provide an indication of a valid timing source.

At stage 1108, the method includes determining a timing source outage area based on the timing information and location information received from the one or more nodes. The server 400, including a processor 410 and a transceiver 415, is a means for determining the timing source outage area. In an example, the LMF 120 may be configured to define an area (e.g., 5, 10, 100, 1000 meters, etc.) for each node suffering a timing source outage and determine the timing outage area based on the union of the areas associated with each node experiencing an outage. Other statistical and grouping techniques may also be used to determine the timing source area. For example, two or nodes may be used to define a diameter length of a circle and at least a portion of the outage area may be a circle based on the diameter length. Other techniques may also be used. Referring to FIG. 8, the loss of signal area 802 defines a timing source outage area based on the locations of the first base station 502*a*, and the first and second UEs 504*a-b*. In an embodiment, the LMF 120 may be configured to determine timing source outage reactions for other nodes in the timing source outage area. For example, the LMF 120 may instruct the other nodes to establish sidelink connections with neighboring nodes and then utilize sidelink relays to provide services to the nodes impacted by the timing source outage. In an embodiment, the timing source outage area may be included in a timing source outage notification message 1000 as an indication in the timing sources impacted information element.

Figure 12:
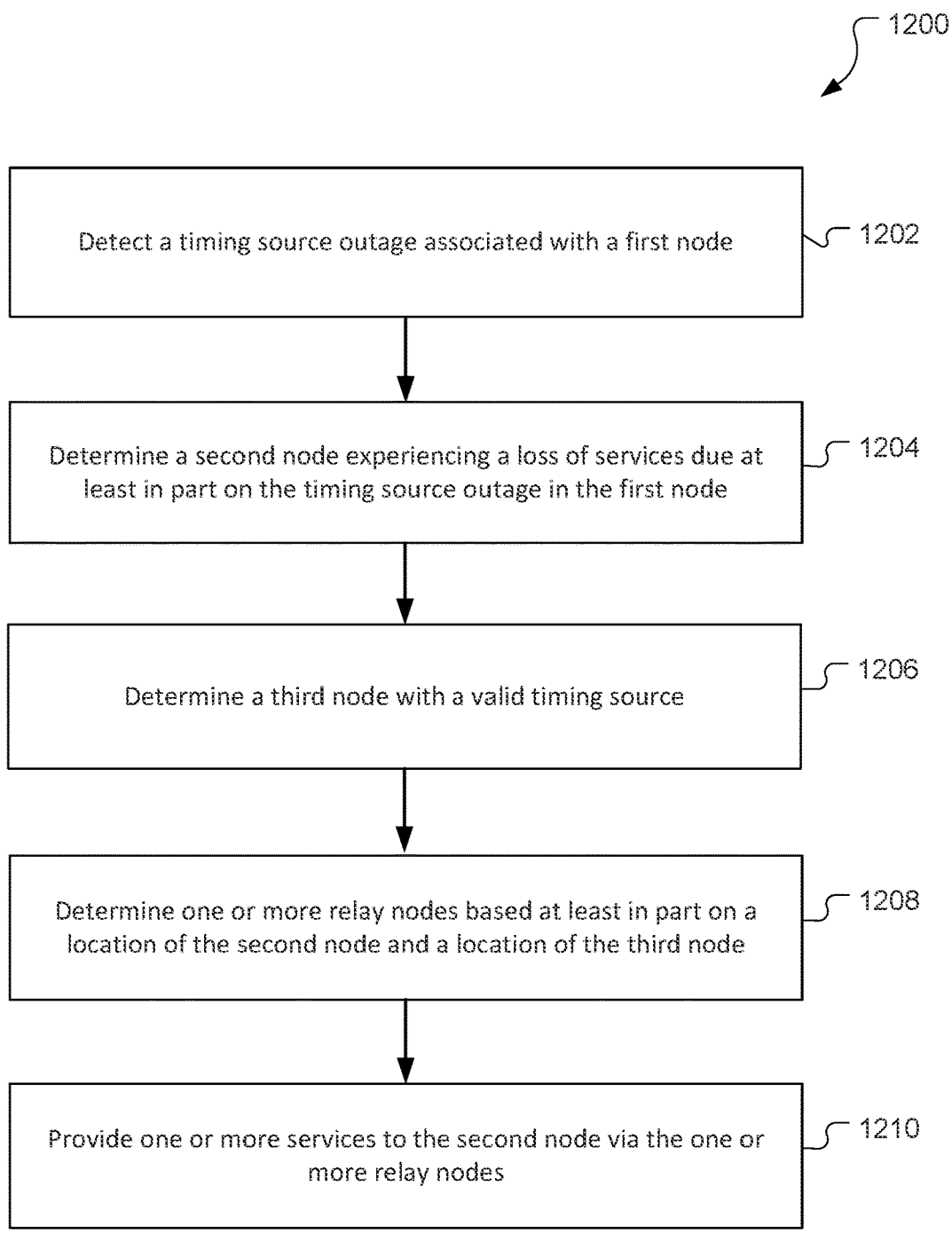
FIG. 12 is a process flow for an example method for utilizing sidelink communications in response to a timing source outage.

Referring to FIG. 12, with further reference to FIGS. 1-10, a method 1200 for utilizing sidelink communications in response to a timing source outage includes the stages shown. The method 1200 is, however, an example and not limiting. The method 1200 may be altered, e.g., by having stages added, removed, rearranged, combined, performed concurrently, and/or having single stages split into multiple stages.

At stage 1202, the method includes detecting a timing source outage associated with a first node. A server 400 such as an LMF 120, including a processor 410 and a transceiver 415, is a means for detecting the timing source outage. In an example, referring to FIG. 8, a TRP such as the first base station 502*a* may be configured to detect a timing outage based on GNSS signal decode failures. Such failures may be caused by transmission issues associated with one or more satellites, jamming, environmental issues, or SPS receiver issues in the TRP. In an embodiment, other network nodes such as UEs, may be configured to detect a timing outage based on reference signals transmitted from an impacted node (e.g., synchronization signals in excess of 10 μsecs), and provide a notification of the timing issues to the impacted TRP and/or other network nodes. The network nodes may be configured to provide the LMF 120 one or more timing source outage notification messages 902 to enable the LMF 120 to detect the timing source outage in a node.

At stage 1204, the method includes determining a second node experiencing a loss of services due at least in part on the timing source outage in the first node. The server 400, including a processor 410 and a transceiver 415, is a means for determining the second node is experiencing the loss of services. In an embodiment, the LMF 120 may determine one or more second nodes based on a coverage area of the first node. For example, referring to the network 700, the first UE 504*a* and second UE 504*b* are experiencing a loss of services based on the first base station 502*a* experiencing a timing source outage. In an example, a gNB such as the first base station 502*a* may send a timing source outage notification to the UEs it is currently serving. Nodes experiencing a loss of service may also include out-of-coverage nodes which are communicating with the first node via a sidelink relay, such as the third UE 504*c* in the network 700. In another example, referring to the network 800, the first UE 504*a* and second UE 504*b* are experiencing a loss of services based on the first base station 502*a* experiencing a timing source outage. In an embodiment, the nodes experiencing a loss of services may provide one or more messages/requests to the LMF 120 indicating a loss of service/a request for a service. The services may be related to synchronous dependent data communications and reference signal information (e.g., synchronized channel control, cross-linked interference (CLI) coordination information, handoff/mobility sets, time based positioning, etc.). A mobility set may include a set of nodes identified by station identification fields which a UE may utilize for handoff procedures if certain condition is met. A UE may be configured to monitor signal quality from cells in these sets, and cells are added/deleted/moved between these sets based on these measurements, loading, and position/velocity/heading etc.

At stage 1206, the method includes determining a third node with a valid timing source. The server 400, including a processor 410 and a transceiver 415, is a means for determining a third node. In an embodiment, the LMF 120 may be configured to receive timing source outage information from nodes in response to sending one or more timing source outage notification messages 906. In an example, a gNB experiencing the timing source outage may reference neighboring gNB with valid timing sources (e.g., with synchronized time information). An out of synchronization gNB may configure the UEs it is serving to change their respective synchronization preference. The timing source outage information may indicate that a node has a valid timing source. In an example, the LMF 120 may select the third node based on a proximity to the second node, or based on a density of devices between the second and third nodes. For example, referring to FIG. 8, the second node may be the first UE 504*a*, which is experiencing a loss of services based on the timing source outage in the first base station 502*a* (i.e., the first node). The LMF 120 may select the third UE 504*c* as the third node based on the proximity to the first UE 504*a*, and/or the presence of the second UE 504*b*.

At stage 1208, the method includes determining one or more relay nodes based at least in part on a location of the second node and a location of the third node. The server 400, including a processor 410 and a transceiver 415, is a means for determining one or more relay nodes. In an embodiment, the LMF 120 may be configured to provide sidelink configuration information to one or more nodes to enable the nodes to discover neighboring nodes and establish sidelink communications. In an example, the sidelink configuration information may be transmitted by base stations in system information blocks (SIBs), or other OTA signaling. For example, referring to FIG. 8, the LMF 120 may configure a sidelink relay from the third UE 504*c* to the first UE 504*b* via the second UE 504*b*. In an embodiment, a gNB suffering the timing source outage may be configured to provide sidelink configuration information to one or more nodes.

At stage 1210, the method includes providing one or more services to the second node via one or more relay nodes. The server 400, including a processor 410 and a transceiver 415, is a means for providing the one or more services. In an embodiment, the LMF 120 may configure the third node to provide timing information to the second node. Other data associated with other services may also be provided via the sidelink relay. For example, reference signal information (e.g., synchronized channel control, CLI coordination information, handoff/mobility sets, time based positioning, etc.) and other services related to synchronous dependent data communications.

Figure 13:
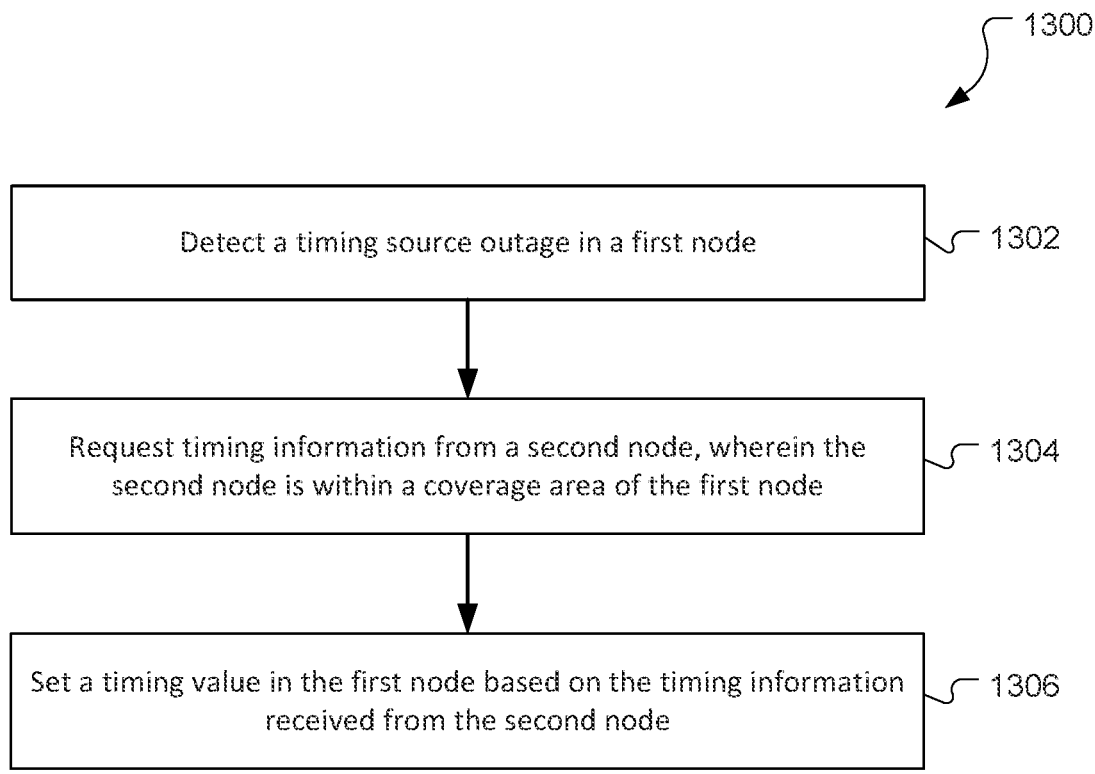
FIG. 13 is a process flow for an example method for establishing a synchronization time with an in-coverage node.

Referring to FIG. 13, with further reference to FIGS. 1-10, a method 1300 for establishing a synchronization time with an in-coverage node includes the stages shown. The method 1300 is, however, an example and not limiting. The method 1300 may be altered, e.g., by having stages added, removed, rearranged, combined, performed concurrently, and/or having single stages split into multiple stages.

At stage 1302, the method includes detecting a timing source outage in a first node. A TRP 300 such as the first base station 502*a*, including a processor 310, a transceiver 315 and a SPS receiver 317, is a means for detecting the timing source outage. In an example, referring to FIG. 7, the first base station 502*a* may be configured to detect a timing outage based on GNSS signal decode failures. Such failures may be caused by transmission issues associated with one or more satellites, jamming, environmental factors, or SPS receiver issues in the TRP. In an embodiment, other network nodes such as UEs, may be configured to detect a timing outage based on reference signals transmitted from an impacted node (e.g., synchronization signals in excess of 10 μsecs), and provide a notification of the timing issues to the impacted TRP and/or other network nodes. The first base station 502*a* may provide other network nodes (e.g., the LMF 120, the first UE 504*a*) one or more timing source outage notification messages 902, 904 to notify the nodes of the timing source outage.

At stage 1304, the method includes requesting timing information from a second node, wherein the second node is within a coverage area of the first node. The TRP 300, including the processor 310 and the transceiver 315, is a means for requesting timing information. In an embodiment, a node may respond to a timing source outage notification messages with an indication of whether the node has a valid time source or not. The TRP 300 and/or the LMF 120 may determine the second node based on the timing information and the ability to communicate with the first node (e.g., based on the second node being in the coverage area of the first node). For example, referring to FIG. 7, the first UE 504*a* has a valid timing source (e.g., the satellite 506), is within the coverage area 702*a*, and may communicate with the first base station 502*a* via the forward and reverse link 512. The second UE 504*b* also has a valid timing source (e.g., the satellite 506), is within the coverage area 702*a*, and may communicate with the first base station 502*a* via the sidelink connection 514 with the first UE 504*a*, which is in communication with the first base station 502*a* via the link 512.

At stage 1306, the method includes setting a timing value in the first node based on the timing information received from the second node. The TRP 300, including the processor 310 and the transceiver 315, is a means for setting the timing value. In an example, the GNSS based time utilized by the first UE 504*a* may be transmitted to the first base station 502*a*. The first base station 502*a* may be configured to modify the received time based on the propagation delay between the node with the time source (e.g., the first or second UEs 504*a*-*b*) and the base station.

Figure 14:
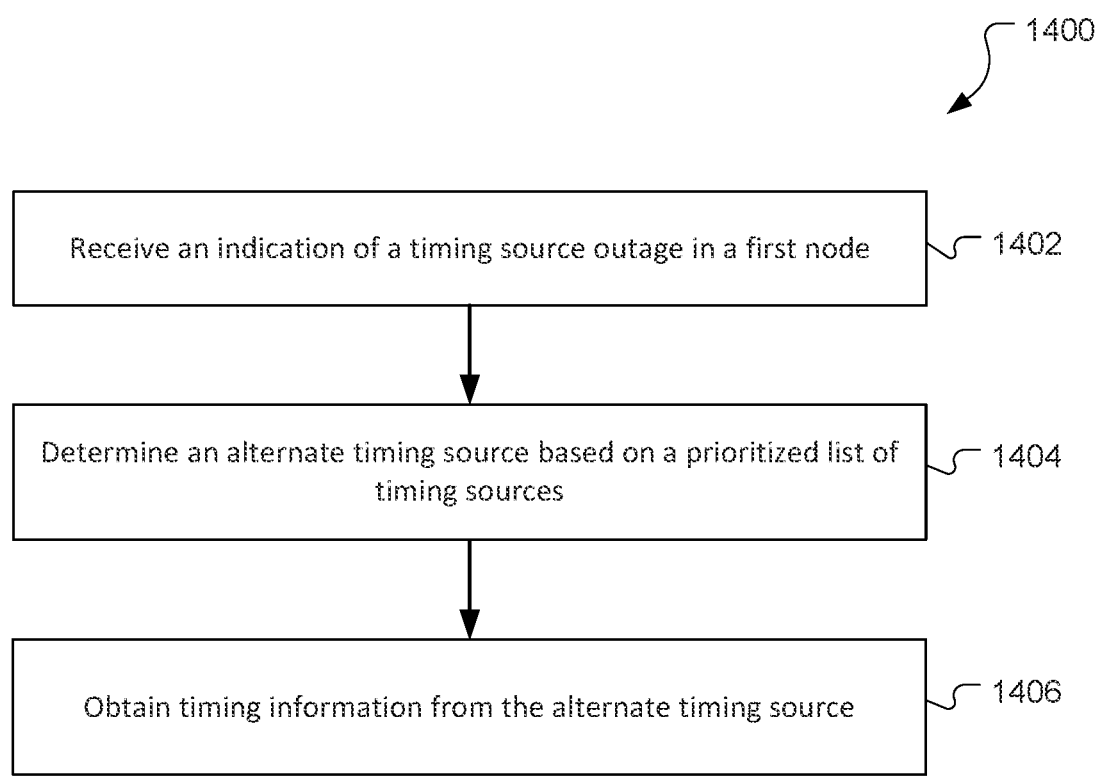
FIG. 14 is a process flow for an example method for selecting an alternate timing source.

Referring to FIG. 14, with further reference to FIGS. 1-10, a method 1400 for selecting an alternate timing source includes the stages shown. The method 1400 is, however, an example and not limiting. The method 1400 may be altered, e.g., by having stages added, removed, rearranged, combined, performed concurrently, and/or having single stages split into multiple stages.

At stage 1402, the method includes receiving an indication of a timing source outage in a first node. A UE 200, including a general-purpose processor 230 and a transceiver 215, is a means for detecting the timing source outage. In an example, the indication of the timing source outage may be based on a failure to decode a satellite signal. That is, a node may self-detect the timing source outage based on GNSS signal decode failures. Such failures may be caused by transmission issues associated with one or more satellites, jamming, environmental conditions, or SPS receiver issues in the TRP. In an embodiment, other network nodes such as UEs, may be configured to detect a timing outage based on reference signals transmitted from an impacted node (e.g., synchronization signals in excess of 10 μsecs), and provide a notification of the timing issues to the impacted TRP and/or other network nodes. The first base station 502*a* may provide other network nodes (e.g., the LMF 120, the first UE 504*a*) one or more timing source outage notification messages 902, 904 to notify the nodes of the timing source outage. A UE, such as the first UE 504*a*, may receive the indication of the timing source outage from the LMF 120 (e.g. via LPP messaging) and/or via a gNB (e.g., the first base station 502*a*) via OTA signaling such as RRC, MAC-CE, DCI, etc. In operation, the first UE 504*a* may have derived its timing information from the first base station 502*a* and the indication of the timing source outage may provide a trigger for the first UE 504*a* to obtain an alternate timing source.

At stage 1404, the method includes determining an alternate timing source based on a prioritized list of timing sources. The UE 200, including the general-purpose processor 230, the transceiver 215, and the memory 211, is a means for determining the alternate timing source. In an embodiment, a network resource such as the LMF 120, or other network server including a clock management function, may provide one or more data structures to the network nodes including a timing source lists 704 with a prioritized list of timing sources. The network resource may be collocated with a node experiencing the timing source outage. The timing outage notification received at stage 1402 may trigger the UE 200 to query the list to obtain an alternate timing source. In an example, the timing source lists 704 may include multiple lists such as one list for prioritizing GNSS-based timing sources (e.g., different satellites) and one list for RAN-based timing sources (e.g., gNB IDs, SL UEIDs). One or more of the information elements in a timing source outage notification message 1000 may be used to query the timing source lists 704. For example, the outage reason IE and the timing sources impacted IE may be used to filter the timing source lists 704 and enable the UE 200 to select an alternative timing source based on a priority value. For example, if the outage reason is a wide area GNSS outage, the timing source lists 704 may prioritize a sidelink timing source from a station with a RAN based time. The timing source lists 704 enables the UE 200 to identify an alternative timing source in the event of a timing source outage, such that the alternative timing source is based at least in part on the information elements in the timing source outage information message received by the UE 200. A network server (e.g., LMF 120, or other server communicatively coupled to a TRP 300) may provide the timing source lists 704 to other network nodes. The timing source lists 704 may be updated periodically or based on context changes for the UE 200 (e.g., a new location, changes in neighboring stations, emergent network equipment casualties, change in satellite status, timing outage notifications, etc.). A gNB may be configured to transmit new SIBs with updated timing source lists 704 based on the context changes.

At stage 1406, the method includes obtaining timing information from the alternate timing source. The UE 200, including the general-purpose processor 230, transceiver 215 and the SPS receiver 217, is a means for obtaining the timing information. In an example, referring to FIG. 7, the timing source lists 704 on the first UE 504*a* may indicate GNSS as a timing source in response to the first base station 502*a* experiencing a timing source outage, and the first UE 504*a* may obtain timing information from the satellite 506. In an other example, referring to FIG. 8, the timing source lists 704 on the UE 504*a* may indicate another base station as a alternate timing source in the event of a large area GNSS outage. The timing source lists 704 may further indicate possible sidelink connections (e.g., neighboring UEs, RSUs) as alternate timing sources if a connection to a base station is not possible (e.g., out of range). The sidelink connections may be based on neighbors with valid time sources and/or that are in a sidelink chain to a valid timing source. The timing source lists 704 may include other possible alternate timing sources based on the timing source outage notification information elements. The UE 200 is configured to obtain the timing information from the indicated alternate sources. In an embodiment, the UE 200 may further determine propagation delays associated with the alternative sources. For example, the UE 200 may perform an RTT exchange with a neighbor to determine a range and corresponding propagation delay. Other stations in a sidelink chain may be configure to obtain the propagation delay for each link and the UE 200 may be configured to apply the propagation delays to the timing information to obtain a synchronized time.

Other examples and implementations are within the scope of the disclosure and appended claims. For example, due to the nature of software and computers, functions described above can be implemented using software executed by a processor, hardware, firmware, hardwiring, or a combination of any of these. Features implementing functions may also be physically located at various positions, including being distributed such that portions of functions are implemented at different physical locations. For example, one or more functions, or one or more portions thereof, discussed above as occurring in the LMF 120 may be performed outside of the LMF 120 such as by the TRP 300.

Components, functional or otherwise, shown in the figures and/or discussed herein as being connected or communicating with each other are communicatively coupled unless otherwise noted. That is, they may be directly or indirectly connected to enable communication between them.

As used herein, unless otherwise stated, a statement that a function or operation is "based on" an item or condition means that the function or operation is based on the stated item or condition and may be based on one or more items and/or conditions in addition to the stated item or condition.

As used herein, the singular forms "a," "an," and "the" include the plural forms as well, unless the context clearly indicates otherwise. For example, "a processor" may include one processor or multiple processors. The terms "comprises," "comprising," "includes," and/or "including," as used herein, specify the presence of stated features, integers, steps, operations, elements, and/or components, but do not preclude the presence or addition of one or more other features, integers, steps, operations, elements, components, and/or groups thereof.

Also, as used herein, "or" as used in a list of items (possibly prefaced by "at least one of" or prefaced by "one or more of") indicates a disjunctive list such that, for example, a list of "at least one of A, B, or C," or a list of "one or more of A, B, or C" or a list of "A or B or C" means A, or B, or C, or AB (A and B), or AC (A and C), or BC (B and C), or ABC (i.e., A and B and C), or combinations with more than one feature (e.g., AA, AAB, ABBC, etc.). Thus, a recitation that an item, e.g., a processor, is configured to perform a function regarding at least one of A or B, or a recitation that an item is configured to perform a function A or a function B, means that the item may be configured to perform the function regarding A, or may be configured to perform the function regarding B, or may be configured to perform the function regarding A and B. For example, a phrase of "a processor configured to measure at least one of A or B" or "a processor configured to measure A or measure B" means that the processor may be configured to measure A (and may or may not be configured to measure B), or may be configured to measure B (and may or may not be configured to measure A), or may be configured to measure A and measure B (and may be configured to select which, or both, of A and B to measure). Similarly, a recitation of a means for measuring at least one of A or B includes means for measuring A (which may or may not be able to measure B), or means for measuring B (and may or may not be configured to measure A), or means for measuring A and B (which may be able to select which, or both, of A and B to measure). As another example, a recitation that an item, e.g., a processor, is configured to at least one of perform function X or perform function Y means that the item may be configured to perform the function X, or may be configured to perform the function Y, or may be configured to perform the function X and to perform the function Y. For example, a phrase of "a processor configured to at least one of measure X or measure Y" means that the processor may be configured to measure X (and may or may not be configured to measure Y), or may be configured to measure Y (and may or may not be configured to measure X), or may be configured to measure X and to measure Y (and may be configured to select which, or both, of X and Y to measure). Substantial variations may be made in accordance with specific requirements. For example, customized hardware might also be used, and/or particular elements might be implemented in hardware, software (including portable software, such as applets, etc.) executed by a processor, or both. Further, connection to other computing devices such as network input/output devices may be employed.

The systems and devices discussed above are examples. Various configurations may omit, substitute, or add various procedures or components as appropriate. For instance, features described with respect to certain configurations may be combined in various other configurations. Different aspects and elements of the configurations may be combined in a similar manner. Also, technology evolves and, thus, many of the elements are examples and do not limit the scope of the disclosure or claims.

A wireless communication system is one in which communications are conveyed wirelessly, i.e., by electromagnetic and/or acoustic waves propagating through atmospheric space rather than through a wire or other physical connection. A wireless communication network may not have all communications transmitted wirelessly, but is configured to have at least some communications transmitted wirelessly. Further, the term "wireless communication device," or similar term, does not require that the functionality of the device is exclusively, or evenly primarily, for communication, or that the device be a mobile device, but indicates that the device includes wireless communication capability (one-way or two-way), e.g., includes at least one radio (each radio being part of a transmitter, receiver, or transceiver) for wireless communication.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations, and does not limit the scope, applicability, or configurations of the claims. Rather, the preceding description of the configurations provides a description for implementing described techniques. Various changes may be made in the function and arrangement of elements without departing from the scope of the disclosure.

The terms "processor-readable medium," "machine-readable medium," and "computer-readable medium," as used herein, refer to any medium that participates in providing data that causes a machine to operate in a specific fashion. Using a computing platform, various processor-readable media might be involved in providing instructions/code to processor(s) for execution and/or might be used to store and/or carry such instructions/code (e.g., as signals). In many implementations, a processor-readable medium is a physical and/or tangible storage medium. Such a medium may take many forms, including but not limited to, non-volatile media and volatile media. Non-volatile media include, for example, optical and/or magnetic disks. Volatile media include, without limitation, dynamic memory.

A statement that a value exceeds (or is more than or above) a first threshold value is equivalent to a statement that the value meets or exceeds a second threshold value that is slightly greater than the first threshold value, e.g., the second threshold value being one value higher than the first threshold value in the resolution of a computing system. A statement that a value is less than (or is within or below) a first threshold value is equivalent to a statement that the value is less than or equal to a second threshold value that is slightly lower than the first threshold value, e.g., the second threshold value being one value lower than the first threshold value in the resolution of a computing system.

Implementation examples are described in the following numbered clauses:

1. A method for utilizing sidelink communications in response to a timing source outage, comprising:
   detecting the timing source outage associated with a first node;
   determining a second node experiencing a loss of services due to least in part on the timing source outage in the first node;
   determining a third node with a valid timing source;
   determining one or more relay nodes based at least in part on a location of the second node and a location of the third node; and
   providing one or more services to the second node via the one or more relay nodes.

2. The method of clause 1 wherein the timing source outage is based on a failure to decode a global navigation satellite system satellite signal.

3. The method of clause 1 wherein determining the second node includes determining a coverage area for the first node and determining that the second node is within the coverage area.

4. The method of clause 1 wherein determining the third node includes receiving an indication of the valid timing source from the third node.

5. The method of clause 1 wherein the one or more services includes a time value based on the valid timing source.

6. The method of clause 1 wherein the one or more services includes one or more positioning reference signal resources.

7. The method of clause 1 wherein the one or more services includes a mobility set.

8. The method of clause 1 further comprising providing sidelink configuration information to the one or more relay nodes.

9. The method of clause 8 wherein the sidelink configuration information is provided via one or more system information blocks transmitted to the one or more relay nodes via radio resource control signaling.

10. A method for selecting an alternate timing source, comprising:
    receiving an indication of a timing source outage in a first node;
    determining the alternate timing source based on a prioritized list of timing sources; and
    obtaining timing information from the alternate timing source.

11. The method of clause 10 wherein the indication of the timing source outage is a failure to decode a global navigation satellite system satellite signal.

12. The method of clause 10 wherein the indication of a timing of the timing source outage is one or more timing source outage notification messages.

13. The method of clause 12 wherein determining the alternate timing source is based at least in part on one or more information elements in the one or more timing source outage notification messages.

14. The method of clause 10 further comprising receiving the prioritized list of timing sources from a network server.

15. The method of clause 14 wherein the prioritized list of timing sources is included in one or more system information blocks.

16. The method of clause 14 wherein the prioritized list of timing sources is included in one or more long term evolution positioning protocol messages.

17. The method of clause 10 wherein the alternate timing source is a radio access network time obtained from a second node.

18. The method of clause 10 wherein the alternate timing source is a global navigation satellite system time.

19. The method of clause 10 wherein the alternate timing source is a user equipment, and the timing information is obtained via a sidelink connection with the user equipment.

20. An apparatus, comprising:
    a memory;
    at least one transceiver;
    at least one processor communicatively coupled to the memory and the at least one transceiver, and configured to:
    detect a timing source outage associated with a first node;
    determine a second node experiencing a loss of services due to least in part on the timing source outage in the first node;
    determine a third node with a valid timing source;
    determine one or more relay nodes based at least in part on a location of the second node and a location of the third node; and
    provide one or more services to the second node via the one or more relay nodes.

21. The apparatus of clause 20 wherein the at least one processor is further configured to determine the timing source outage based on a failure to decode a global navigation satellite system satellite signal.

22. The apparatus of clause 20 wherein the at least one processor is further configured to determine a coverage area for the first node and determine that the second node is within the coverage area.

23. The apparatus of clause 20 wherein the at least one processor is further configured to receive an indication of the valid timing source from the third node.

24. The apparatus of clause 20 wherein the one or more services includes a time value based on the valid timing source.

25. The apparatus of clause 20 wherein the one or more services includes one or more positioning reference signal resources.

26. The apparatus of clause 20 wherein the one or more services includes a mobility set.

27. The apparatus of clause 20 wherein the at least one processor is further configured to provide sidelink configuration information to the one or more relay nodes.

28. The apparatus of clause 27 wherein the at least one processor is further configured to receive the sidelink configuration information via one or more system information blocks transmitted to the one or more relay nodes via radio resource control signaling.

29. An apparatus, comprising:
    a memory;
    at least one transceiver;
    at least one processor communicatively coupled to the memory and the at least one transceiver and configured to:
    receive an indication of a timing source outage in a first node;
    determine an alternate timing source based on a prioritized list of timing sources; and
    obtain timing information from the alternate timing source.

30. The apparatus of clause 29 wherein the at least one processor is further configured to determine the indication of the timing source outage based on a failure to decode a global navigation satellite system satellite signal.

31. The apparatus of clause 29 wherein the indication of the timing source outage is one or more timing source outage notification messages.

32. The apparatus of clause 31 wherein the at least one processor is further configured to determine the alternate timing source based at least in part on one or more information elements in the one or more timing source outage notification messages.

33. The apparatus of clause 29 wherein the at least one processor is further configured to receive the prioritized list of timing sources from a network server.

34. The apparatus of clause 33 wherein the prioritized list of timing sources is included in one or more system information blocks.

35. The apparatus of clause 33 wherein the prioritized list of timing sources is included in one or more long term evolution positioning protocol messages.

36. The apparatus of clause 29 wherein the alternate timing source is a radio access network time obtained from a second node.

37. The apparatus of clause 29 wherein the alternate timing source is a global navigation satellite system time.

38. The apparatus of clause 29 wherein the alternate timing source is a user equipment, and the timing information is obtained via a sidelink connection with the user equipment.

39. An apparatus for utilizing sidelink communications in response to a timing source outage, comprising:
 means for detecting the timing source outage associated with a first node;
 means for determining a second node experiencing a loss of services due to least in part on the timing source outage in the first node;
 means for determining a third node with a valid timing source;
 means for determining one or more relay nodes based at least in part on a location of the second node and a location of the third node; and
 means for providing one or more services to the second node via the one or more relay nodes.

40. An apparatus for selecting an alternate timing source, comprising:
 means for receiving an indication of a timing source outage in a first node;
 means for determining the alternate timing source based on a prioritized list of timing sources; and
 means for obtaining timing information from the alternate timing source.

41. A non-transitory processor-readable storage medium comprising processor-readable instructions configured to cause one or more processors to utilize sidelink communications in response to a timing source outage, comprising:
 code for detecting the timing source outage associated with a first node;
 code for determining a second node experiencing a loss of services due to least in part on the timing source outage in the first node;
 code for determining a third node with a valid timing source;
 code for determining one or more relay nodes based at least in part on a location of the second node and a location of the third node; and
 code for providing one or more services to the second node via the one or more relay nodes.

42. A non-transitory processor-readable storage medium comprising processor-readable instructions configured to cause one or more processors to select an alternate timing source, comprising:
 code for receiving an indication of a timing source outage in a first node;
 code for determining the alternate timing source based on a prioritized list of timing sources; and
 code for obtaining timing information from the alternate timing source.

The invention claimed is:
1. A method for utilizing sidelink communications in response to a timing source outage, comprising:
 detecting the timing source outage associated with a first node;
 sending a timing source outage notification message to at least one node;
 determining a second node experiencing a loss of services due to least in part on the timing source outage in the first node;
 determining a third node with a valid timing source;
 determining one or more relay nodes based at least in part on a location of the second node and a location of the third node; and
 providing one or more services to the second node via the one or more relay nodes.

2. The method of claim 1 wherein the timing source outage is based on a failure to decode a global navigation satellite system satellite signal.

3. The method of claim 1 wherein determining the second node includes determining a coverage area for the first node and determining that the second node is within the coverage area.

4. The method of claim 1 wherein determining the third node includes receiving an indication of the valid timing source from the third node.

5. The method of claim 1 wherein the one or more services includes a time value based on the valid timing source.

6. The method of claim 1 wherein the one or more services includes one or more positioning reference signal resources.

7. The method of claim 1 wherein the one or more services includes a mobility set.

8. The method of claim 1 further comprising providing sidelink configuration information to the one or more relay nodes.

9. The method of claim 8 wherein the sidelink configuration information is provided via one or more system information blocks transmitted to the one or more relay nodes via radio resource control signaling.

10. An apparatus, comprising:
 a memory;
 at least one transceiver;
 at least one processor communicatively coupled to the memory and the at least one transceiver, and configured to:
  detect a timing source outage associated with a first node;
  send a timing source outage notification message to at least one node;
  determine a second node experiencing a loss of services due to least in part on the timing source outage in the first node;
  determine a third node with a valid timing source;

determine one or more relay nodes based at least in part on a location of the second node and a location of the third node; and provide one or more services to the second node via the one or more relay nodes.

11. The apparatus of claim 10 wherein the at least one processor is further configured to determine the timing source outage based on a failure to decode a global navigation satellite system satellite signal.

12. The apparatus of claim 10 wherein the at least one processor is further configured to determine a coverage area for the first node and determine that the second node is within the coverage area.

13. The apparatus of claim 10 wherein the at least one processor is further configured to receive an indication of the valid timing source from the third node.

14. The apparatus of claim 10 wherein the one or more services includes one or more of a time value based on the valid timing source, one or more positioning reference signal resources, a mobility set, or combinations thereof.

15. The apparatus of claim 10 wherein the at least one processor is further configured to receive sidelink configuration information via one or more system information blocks transmitted to the one or more relay nodes via radio resource control signaling.

* * * * *